United States Patent [19]
Issler et al.

[11] Patent Number: 5,995,040
[45] Date of Patent: Nov. 30, 1999

[54] GLOBAL SPACE RADIOPOSITIONING AND RADIONAVIGATION SYSTEM, BEACON AND RECEIVER USED IN THIS SYSTEM

[75] Inventors: Jean Luc Issler, St Orens; Jean Paul Aguttes; Dominique Berges, both of Toulouse; Bruno Cugny, Quint-Fonsegrives, all of France

[73] Assignee: Centre National D'Etudes Spatiales, Paris, France

[21] Appl. No.: 08/860,715
[22] PCT Filed: Nov. 12, 1996
[86] PCT No.: PCT/FR96/01778
§ 371 Date: Jul. 14, 1997
§ 102(e) Date: Jul. 14, 1997
[87] PCT Pub. No.: WO97/18485
PCT Pub. Date: May 22, 1997

[30] Foreign Application Priority Data

Nov. 14, 1995 [FR] France ................................. 95 13478

[51] Int. Cl.⁶ ..................................................... H04B 7/185
[52] U.S. Cl. ........................................... 342/352; 455/12.1
[58] Field of Search .......................... 342/352; 455/12.1, 455/13.1

[56] References Cited

U.S. PATENT DOCUMENTS 4,445,118 4/1984 Taylor et al. .

*Primary Examiner*—Theodore M. Blum
*Attorney, Agent, or Firm*—Oblon, Spivak, McClelland, Maier & Neustadt, P.C.

[57] ABSTRACT

This invention relates to a global system dedicated to radionavigation and radiopositioning and includes:

a land segment comprising:

a global network of ground beacons (RBS) emitting an upwards wide spectrum radioelectric signal to user satellites, a mission and control center (CMC) which creates work plans for some user satellites and transmits them when they fly over the master beacons, a processing center (CT) that receives remote measures sorted by the mission and control center (CMC), separates remote measurements into remote measurements necessary for processing specific to the processing center (CT), and remote measurements specific to some clients of services offered by the said system;

a space segment composed of mater satellites (SM) participating closely in operation of the system and client satellites;

a user segment composed of client beacons and fixed or mobile client receivers.

36 Claims, 17 Drawing Sheets

FIG. 12
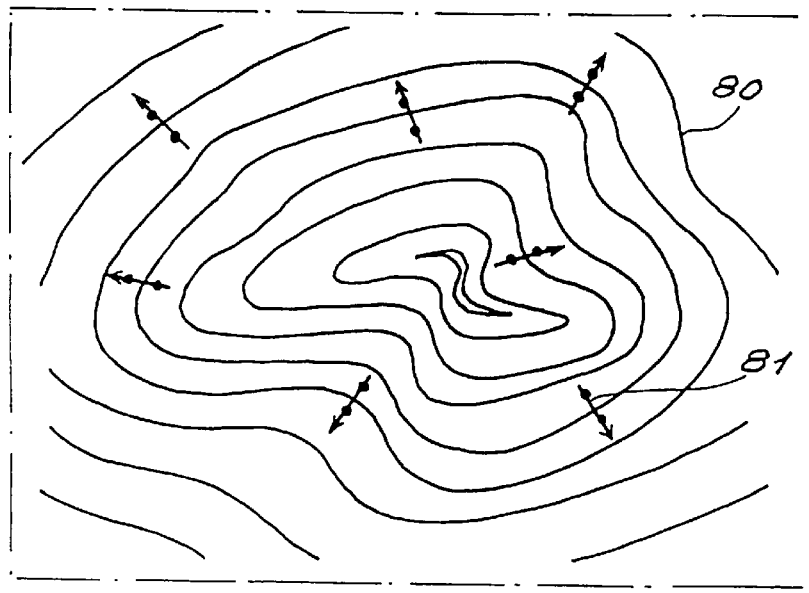
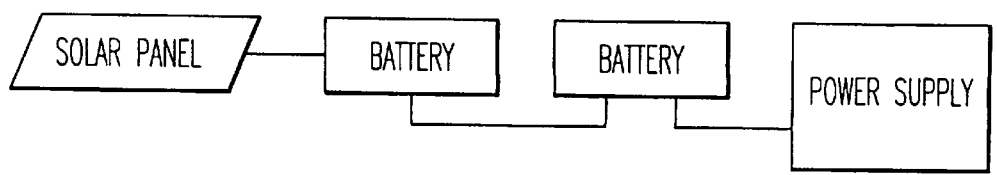
FIG. 13
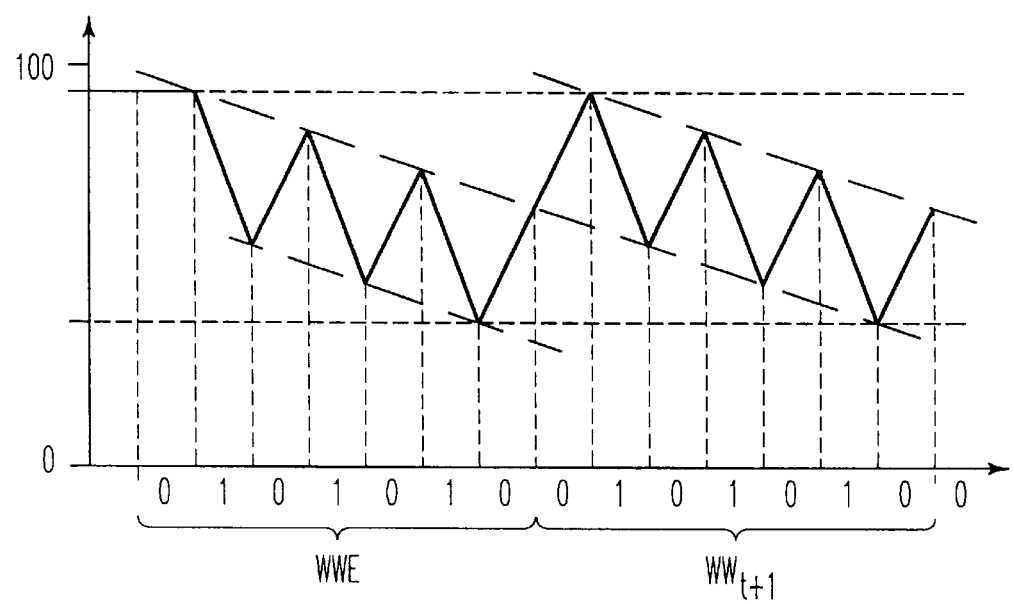
FIG. 14

GLOBAL SPACE RADIOPOSITIONING AND RADIONAVIGATION SYSTEM, BEACON AND RECEIVER USED IN THIS SYSTEM

DESCRIPTION

1. Technical Field

This invention relates to a global system dedicated to radionavigation and radiopositioning of mobile units (for example satellites) and fixed points. It also relates to beacons and receivers used in the said system.

2. State of Prior Art

Known state of the art systems include the DORIS system, the GPS system, the GLONASS system and the PRARE system.

The DORIS system is described in references [1] [2] and [3].

The GPS-NAVSTAR system is described in reference [4].

The GLONASS system is described in reference [5].

The PRARE system is described in reference [6].

The purpose of the invention is a universal radionavigation/positioning system that is more precise and is better adapted for a large number of navigation and positioning applications, than the systems mentioned above made using prior art.

The invention is part of the GNSS (Global Navigation Space System) that refers to all global radionavigation systems using a space segment and short spectrum spreading codes.

DESCRIPTION OF THE INVENTION

This invention provides a global system dedicated to radionavigation and radiopositioning of mobiles and fixed points, characterized in that it comprises a land segment, a space segment and a user segment, and that the land segment comprises the following elements:

- a main network of beacons on the ground emitting an upwards single-directional radioelectric signal with a wide spectrum towards user satellites, each of these beacons transmitting a message containing a beacon identification code;
- a control center that creates work plans for some user satellites and transmits them when the satellites overfly the master beacons;
- a processing center that receives remote measures sorted by the control center, separates remote measurements into two groups, one containing remote measurements necessary for processes specific to the processing center, and the other containing remote measurements specific to some clients of services offered by the said system;

and in that the space segment is composed of master satellites and client satellites, the master satellites closely participating in operation of the system, and in that the user segment is composed mainly of mobiles carrying specific receivers, and fixed client beacons.

The ground beacons are advantageously of two types, and particularly:

- orbitography beacons the position of which is known perfectly and which permanently transmit a signal and periodically transmit their positions (and in some cases their velocity);
- client beacons, which may have an initially unknown position when they are put into service;
- master beacons, which transmit useful information and work plans to some user satellites and/or a part of the system accepting data.

The system also comprises autonomous local receiver and beacon cells not necessarily radioelectrically connected to the satellites in the said system.

The processing center advantageously produces the following output:

- the precise orbitography and some routine orders for some user satellites;
- the precise attitude of some user satellites;
- representative parameters of the ionosphere;
- monitoring the displacement of orbitography beacons;
- clock coefficient of some beacons, references with respect to the system time; the system time itself being produced by the processing center;
- earth rotation parameters; these outputs being distributed firstly to clients of services provided by the system according to the invention and returned to the control center that uses them to generate its work and programming plans, and to provide routine orbits to remote measurement/remote control stations using services provided by the system according to the invention.

Master satellites may be equipped with a special receiver connected to an ultra-stable oscillator, the unprocessed measurements made by this receiver and the data originating from the beacons being formatted in the form of remote measurements received by the ground, with the processing center as the final destination. Master satellites are capable of processing the message transmitted by the master beacons.

Master satellites have quasi-heliosynchronous type orbits, possibly together with low type and/or geostationary orbits.

Client satellites do not necessarily address their remote measurement to the processing center. Client satellites are not necessarily capable of processing the message transmitted by the master beacons.

Client satellites may be in any type of orbit and form part of the space segment and the system user segment simultaneously.

Client beacons are mainly positioning beacons, or time beacons.

Advantageously, beacons are connected to a microcomputer used to program some beacon parameters and verify that they are working correctly.

The microcomputer is connected to local measurement sensors such as:

- meteorological data sensors;
- GNSS unprocessed measurement sensors, or GNSS differential correction sensors;
- clock coefficient sensors;
- sensors detecting the condition of various elements making up the beacon in order to make remote failure diagnostics at the control center;
- calibration sensors.

Beacons may be single-frequency or dual frequency.

The system according to the invention advantageously includes precision beacons.

In the said system, two beacons assigned with an identical PN code and which will nominally be tracked by a single satellite are separated by a range exceeding the diameter of a visibility circle associated with the said satellite.

Advantageously, carriers transmitted by the beacons are all modulated by a short spectrum spreading code (called the reference code).

The system according to the invention may include single frequency or dual frequency receivers.

Precision beacons may be dual frequency and each carrier transmitted is modulated by a long spectrum spreading code (called the precision code) and by a short code (called the reference code).

Advantageously, the system according to the invention includes orbiting receivers, or receivers close to the ground surface (fixed or mobiles).

Receivers may be:

basic receivers;

lost cost navigation receivers;

low cost navigation and attitude detection receivers;

navigation and attitude receivers;

receivers for navigation, orbitography and precision attitude detection;

mixed receivers capable of processing signals transmitted by system beacons and by satellites in GNSS constellations.

The system according to the invention may include receivers processing reference codes only, and receivers processing reference codes and precision codes at the same time (precision receivers).

The system according to the invention may comprise a precision subsystem for monitoring the drift of an orbiting cold atomic clock.

In the system according to the invention, sequencing of emissions from client beacons (if any) can be managed based on a daily cycle described by "Week Words".

In one embodiment, the architectural, electrical and antenna characteristics of all ground beacons are similar, except for:

beacons adapted to precise monitoring of the drift of an orbiting cold atomic clock, which have antennas with a directive diagram, instead of a hemispheric type diagram;

some beacons of local autonomous cells which may have a specific antenna diagram.

Coupled with the technique of interferometric imagery using S.A.R. radar satellites, the system according to the invention may be used to closely monitor deformations of a terrain covered by a mesh of beacons received by a receiver in the said system, mounted on the said radar satellites.

It can provide detailed information about differences between clocks on beacons, and in particular time beacons, by the use of orbiting and geostationary satellites carrying a receiver in the said system.

GNSS2 type navigation satellites may use a receiver in the said system to do their own navigation, and to derive orbital and ephemeris tables to be distributed to users of the said GNSS2 satellites.

The system according to the invention may include local autonomous cells of beacons and receivers, these cells in some cases being radioelectrically connected to master or client satellites.

The invention concerns beacons used in the said system, characterized in that they comprise:

one or several local data sensors;

a control computer connected to the said data sensor;

a reference signal generator controlled by the said oscillator;

a signal generation and transmission module for each transmitted carrier frequency controlled by the reference signal generator; this module comprises:

a carrier generator, a short spectrum spreading code generator, a data formatter controlled by the control computer, the said data modulating the said short code in the base band through an integrator, the complete assembly modulating the carrier with a modulator, an antenna connected to the modulator through an RF amplifier.

Advantageously, the carrier frequencies transmitted by it are specific to the said system.

A precision beacon transmits a dual frequency signal. In this type of precision beacon, at least one of the two signal generation and transmission modules comprises:

a long spectrum spreading code generator;

an integrator modulating the said long code by the message output from the data formatter;

a carrier modulator using the said long code integrated with data;

a $\pi/4$ phase shifter for the said modulated carrier;

an adder, integrating the carrier modulated by the long code in quadrature with the carrier modulated by the short code.

This type of precision beacon transmits long codes at carrier frequencies specific to the said system.

The invention also relates to a receiver used in the said system, characterized in that it comprises the following for each received carrier frequency:

one to four reception antennas;

one to four radiofrequency reception and transposition to intermediate frequency modules, which may be RF chips, connected to an analog digital converter, these modules being specific to the carrier frequency received from the said system;

one or several ASICs (Application Specific Integrated Circuits), in particular processing the short spectrum spreading code modulating the received carrier, these ASICs being suitable for processing the short codes of the said system; and in that it also comprises:

a microprocessor assembly interconnected firstly to the ASICs and secondly to a memory and digital interface assembly;

an oscillator, in particular controlling the radiofrequency reception and transposition to intermediate frequency modules, and the ASICs and the microprocessor assembly.

Advantageously, a radiofrequency reception and transposition module is associated with each antenna, for receivers with parallel RF architecture, or a single radiofrequency reception and intermediate frequency transmission module is interconnected to all antennas through a fast switcher, for receivers with sequenced RF architecture.

Advantageously, one of the radiofrequency reception and intermediate frequency transposition modules in mixed receivers is adapted to one of the two frequencies in the system according to the invention, whereas the other RF reception and IF transposition module is adapted to one of the frequency bands broadcast by satellites in GNSS constellations.

Advantageously, at least one of the two precision receiver reception systems is adapted to reception of long codes in the said system, to the carrier frequencies of the said system, the ASICs associated with at least one of the two reception systems being able to process short codes and long codes associated with the said reception system, at the same time.

The system according to the invention is competitive with GPS or GLONASS systems for most space applications. It is even more competitive for current DORIS or PRARE systems. Furthermore, the system according to the invention is potentially even more powerful than these systems, for most of their space applications.

BRIEF DESCRIPTION OF THE DRAWINGS

FIG. 12 illustrates an SAR interferometric image;

FIGS. 13 and 14 illustrate client beacons containing batteries recharged by solar panels;

DETAILED DESCRIPTION OF EMBODIMENTS

Figure 1:
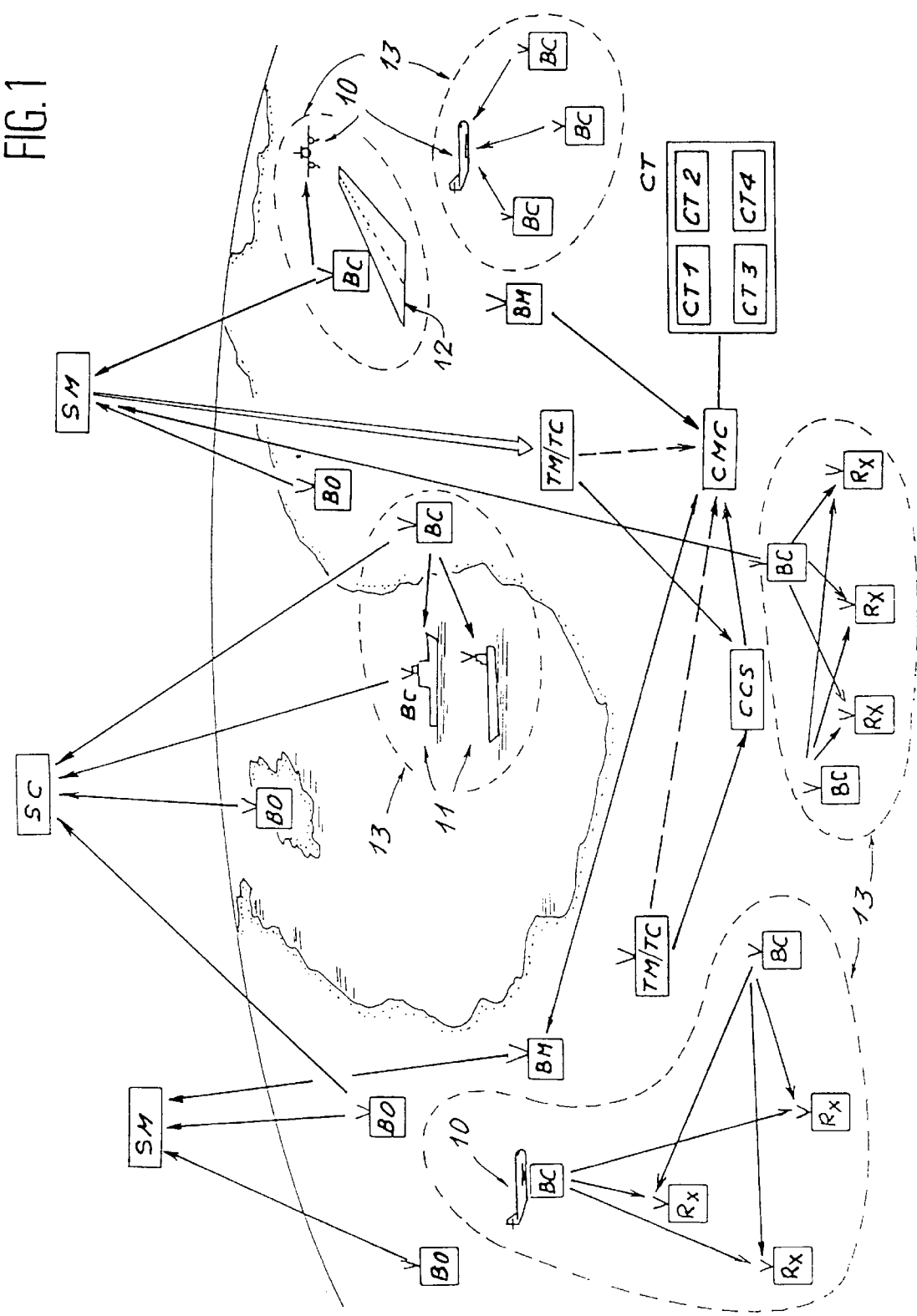
FIG. 1 illustrates the various components of the system according to the invention.

The system according to the invention is dedicated mainly to radionavigation and radiopositioning of satellites and vehicles or fixed points on land. This system will temporarily be called ZZZ while waiting to receive a final name.

At CNES (*Centre National d'Etudes Spatiales*—National Space Studies Center), this ZZZ system is called the DORIS NG (DORIS New Generation system) preliminary project.

This ZZZ system inherits the main advantages of each of the current GPS and DORIS type systems.

The ZZZ system according to the invention and civil satellite navigation systems of the future (GNSS2) are complementary and are designed to eventually form an universal radionavigation positioning system called GNSS3. This will be abbreviated by the following formula:

$$ZZZ+GNSS2=GNSS3.$$

Potential users of the system according to the invention are classified according to different types of need:

Most satellites, for which the operational onboard/ground synchronization and/or navigation and/or orbitography and/or attitude detection needs are compatible with the precision available for these needs, usually better than those available with current GPS or DORIS systems. The reference trajectories of these user satellites are classified into four main categories of circular orbits:

low altitude orbits denoted $h_1$. These orbits are conventionally used by mini-satellites and by micro-satellites;

heliosynchronous type orbits at altitude $h_2$. These orbits are conventionally used by earth observation satellites;

geosynchronous orbits with medium altitude $h_3$, which have a period of close to twelve hours. These orbits are conventionally used by radionavigation satellite constellations (GPS, GLONASS, GNSS2, etc.);

geostationary orbits with altitude $h_4$. These orbits are conventionally used by telecommunications, meteorology and navigation satellites (GNSS1, GNSS2).

This gives:

h1#400 km h2#800 km h3#20,000 km h4#36,000 km

These four types of orbit represent trajectories of satellites once in position. The system according to the invention is also capable of providing an orbitography and/or navigation function for positioning these satellites.

Orbitography/navigation/attitude needs may be classified as follows:

| NEEDS ALTI- | KEEPING IN POSITION | | PUTTING IN POSITION | |
|---|---|---|---|---|
| TUDES | NAV/ORBIT | ATTITUDE | NAV/ORBIT | ATTITUDE |
| $h_1$ | A 11 | A 21 | A 31 | A 41 |
| $h_2$ | A 12 | A 22 | A 32 | A 42 |
| $h_3$ | A 13 | A 23 | A 33 | A 43 |
| $h_4$ | A 14 | A 24 | A 34 | A 44 |

The scientific community, for many applications such as:

B1: Observation of the ionosphere.

B2: The physical and meteorological study of the earth's gaseous atmosphere.

B3: Geodesy, geodynamics and geophysics on a regional or planetary scale (movements of poles, tectonics, etc.).

B4: The study of the field of gravity.

B5: Space altimetry, for ocean study applications.

B6: The study of the theory of relativity.

B7: The study of highly stable onboard clocks.

B8: Precise relative synchronization of clocks on the ground.

B9: Geodesy, geodynamics and geophysics on a local scale (covering an area by a mesh for very precise monitoring of movements, etc.), study, or even prediction of earthquakes and more generally of some natural risks.

B10: monitoring of climatic warming, particularly above the poles, using the beacon radioblanking technique.

In particular, the system according to the invention can contribute to international references in the following domains given as an example:

time standards (UTC);

geodetic reference systems;

gravimetric reference systems;

ionospheric models.

The system according to the invention is potentially more adapted and more precise for most of these applications than the current DORIS system, the current GPS system, and GLONASS and PRARE.

Land navigators:
- C1: Assistance with navigation en route (aircraft, ships).
- C2: Assistance in landing of aircraft.
- C3: Transmission of GNSS directional corrections (for aircraft, boats, satellites).
- C4: Relative air navigation (also applicable to relative navigation for space rendezvous).
- C5: Synchronization of airports.
- C6: Synchronization of GNSS monitoring and/or control stations (GNSS1-step 3, WAAS and GNSS2).
- C7: Space positioning of mobiles with low dynamics such as ships.
- C8: Trajectography and/or local navigation of mobiles (aircraft, launchers, etc.).

National communities:
- D1: Planetary monitoring of particular events with strategic interest.
- D2: Synchronization of land or air bases and of ships.
- D3: Local navigation of machinery (aircraft, ships, satellites, launchers).
- D4: Positioning in space of mobiles with low dynamics, such as ships on the surface of the sea.

Needs D1 to D4 may be satisfied within a context of providing strong resistance to deliberate interference.

Components of the system according to the invention shown in FIG. 1 include a land segment, space segment and user segment.

Land Segment

The land segment comprises the following elements:

A main ground beacons network (RBS) transmitting an upwards radioelectric signal to user satellites. Each beacon transmits a message containing an identification code. There are different types of these beacons, and the three basic categories are described here:

- orbitography beacons (BO), the position of which is known perfectly. The system according to the invention determines the orbit of user satellites using these beacons. Orbitography beacons continuously transmit a signal. Orbitography beacons periodically transmit their position (and in some cases their velocity);

- client beacons (BC), such as positioning beacons (BL) or some time beacons (BT) have their own position and/or time which are initially unknown when they are put into service. The system according to the invention can localize these beacons. These client beacons also form part of the user segment;

- master beacons (BM) that transmit useful information and work plans to some user satellites and/or an accepting parts of the system. These are orbitography beacons (BO) to the extent that initially their location is known perfectly. These beacons are connected to very stable clocks (for example atomic or hydrogen maser clocks). These beacons distribute the system time according to the invention (and an international time reference such as UTC time) in the form of clock coefficients.

A mission and control center (CMC): this center creates work plans for some user satellites and transmits them when these satellites overfly the master beacons. A message to be sent to a specific satellite is preceded by the said satellite's identification code. The control center generates configuration messages for some beacons which are connected to it. It also outputs and classifies remote measurements made for positioning measurements onboard some user satellites, starting from signals transmitted by the received beacons. These remote measurements also contain some parameters recorded by the beacons themselves (for example data from meteorological sensors, general condition, etc.). These remote measurements originate from remote measurements/remote control (TM/TC) stations (not necessarily specific to the system according to the invention) tracking user satellites. They reach the control center either directly or through control centers specific to the satellites concerned (satellite control center, CCS).

A processing center (CT): this processing center (which may be distributed between several entities) receives remote measurements sorted by the control center. This center separates remote measurements into two groups. One contains remote measurements necessary for processing specific to the processing center, and the other receives messages specific to some clients of services offered by the system according to the invention.

For example, outputs from processing at the processing center include:

- precise orbitography and routine orders for some user satellites;
- the precise attitude of some user satellites;
- parameters representing the ionosphere;
- clock coefficients for some beacons referenced with respect to the system time, itself produced by the processing center;
- earth rotation parameters;
- the updated position of beacons.

These products are distributed firstly to clients of services provided by the system according to the invention and are returned to the control center which uses them to prepare its work and programming plans and secondly to provide routine orbits to remote measurement/remote control stations using services provided by the system according to the invention.

Space Segment

The space segment is composed of master satellites and client satellites.

Master satellites (SM) participate closely in operation of the system. Remote measurements made by them are systematically addressed to the processing center. Each is equipped with a specific receiver denoted ZZZ in the rest of this description, and connected to an ultra-stable oscillator (OUS). Unprocessed measurements made by this receiver and data originating from the beacons are systematically formatted in the form of remote measurements received by the ground, with the CT center as their final destination. Master satellites are capable of processing the message transmitted by master beacons. These satellites have quasi-heliosynchronous type orbits, possibly together with low and/or geostationary type orbits.

Client satellites (SC) do not necessarily send their remote measurements to the processing center. Therefore, they are not necessarily equipped with an OUS type oscillator (top of range OCXO). Client satellites are not necessarily capable of processing the message transmitted by master beacons. These satellites may have any type of orbit, and in particular low, heliosynchronous, geosynchronous or geostationary type orbits. Client satellites simultaneously form part of the space segment and the user segment of the system according to the invention.

User Segment

The user segment comprises:
fixed or mobile carriers, such as client satellites, aircraft or ships, equipped with ZZZ receivers;
client beacons, such as positioning beacons (or time beacons).

FIG. 1 illustrates the various components of the system according to the invention. This Figure shows aircraft 10, ships 11 and a landing runway 12.

This Figure also shows local autonomous cells 13 of client beacons and receivers, which may be fixed or mobile close to the surface of the earth. These cells are autonomous to the extent that the use of satellites (masters or clients) is not strictly necessary. However, these cells may be radio-electrically connected to some of the satellites in the system, to provide complementary usage of the system. For example these local cells may satisfy needs such as B9, C1, C2, C3, C4, C8 and D3.

Figure 2:
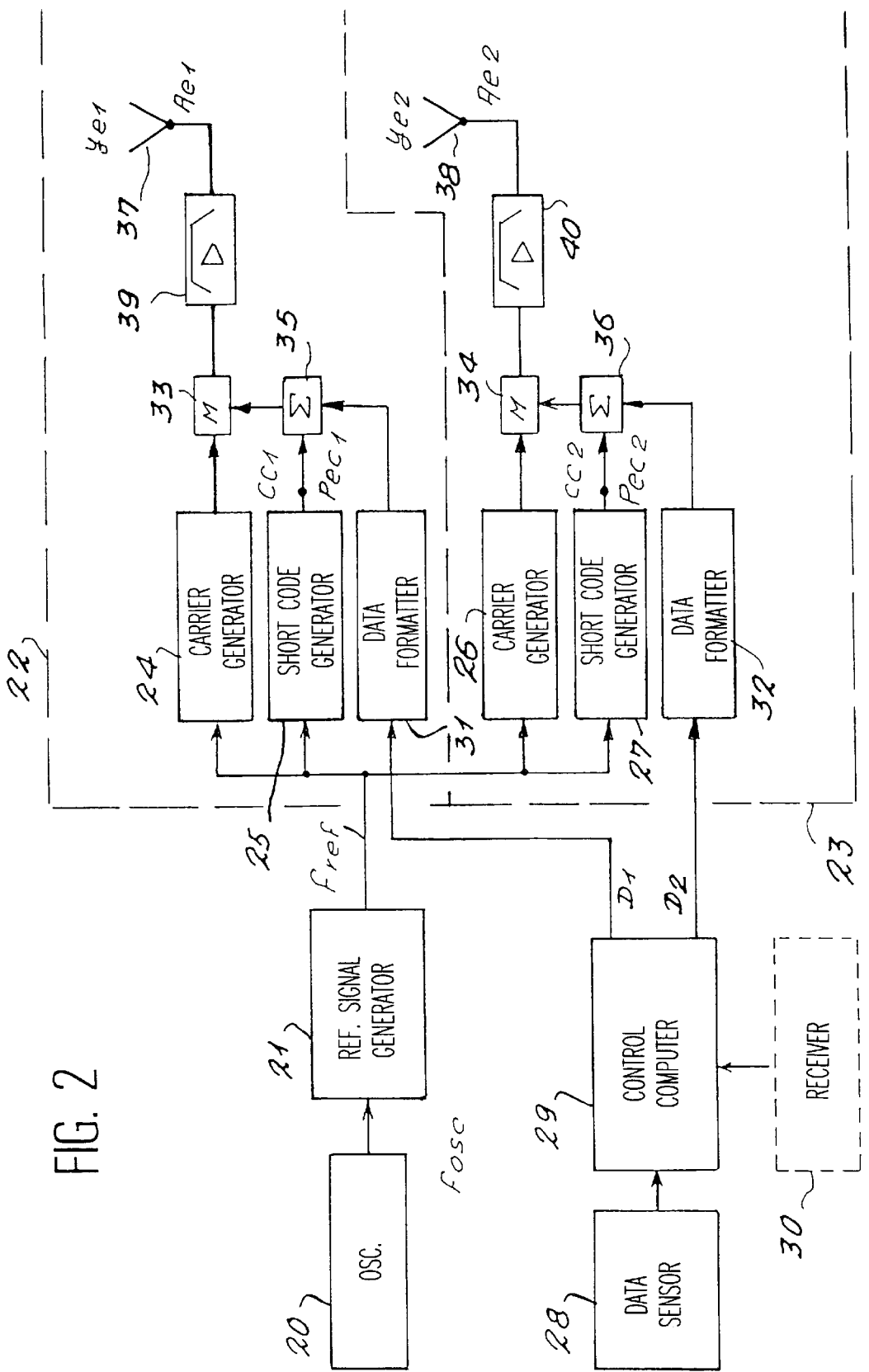
FIG. 2 illustrates the scheme for a reference beacon according to the invention.

FIG. 2 illustrates the scheme for a reference beacon according to the invention.

Therefore, this beacon comprises:
an oscillator 20;
a reference signal generator 21 connected in a signal generation and transmission module 22;
a carrier generator at frequency $f_1$ 24;
a short code generator $C_{c1}$ 25;
and in a signal generation and transmission module 23:
a carrier generator at frequency $f_2$ 26;
a short code generator $C_{c2}$ 27.

A local data sensor 28 is connected to a control computer 29, which may be connected to a MODEM and/or a radio receiver 30. The control computer is connected to a first data formatter 31 located in the generation and transmission module 22, and to a second data formatter 32 located in the generation and transmission module 23.

In each generation and transmission module, the carrier generator 24, 26 is connected to a modulator 33, 34 that receives a control signal from an integrator 35, 36 connected to the code generator and to the formatter. Each modulator is connected to an antenna with an hemispherical type diagram 37, 38 through an RF amplifier 39, 40. A single frequency beacon only contains module 22 or module 23.

DETAILED DEFINITION OF THE SYSTEM ACCORDING TO THE INVENTION

Land Segment

The following definitions are useful to the description of beacons and signals transmitted by them:

$f_i$ = Transmitted carrier frequency No. $i$ (Hz).

$C_{ci}$ = Short pseudo-random code (PN code) modulating carrier No. $i$;

$D_i$ = Data message modulating the $C_{ci}$ code in the base band.

$R_{ci}$ = Rate of PN code No. $i$ (bribe/s).

-continued $N_{ci}$ = Number of bribes in PN code $C_{ci}$.

$T_{ci}$ = Repitition period of code $C_{ci}$ (s).

$T_{ci} = N_{ci} / R_{ci}$.

$A_{ei}$ = Phase center of the transmission antenna at frequency $f_i$.

$P_{eci}$ = Origin point of code $C_{ci}$.

$\Delta\tau_{12Ae}$ = Differential delay between the phases of codes $C_{c1}$ and $C_{c2}$, taken at points $A_{e1}$ and $A_{e2}$ respectively.

$\Delta\tau_{12Pe}$ = Differential delay between the phases of codes $C_{c1}$ and $C_{c2}$, taken at points $P_{ec1}$ and $P_{ec2}$ respectively.

$f_{osc}$ = Beacon oscillator frequency.

$f_{ref}$ = Frequency of the reference signal controlling code and carrier generators.

$n_{pi}; m_{pi}$ = Integer divisions ranks used by the carrier generator No. $i$.

$f_i = f_{ref} \times \dfrac{n_{pi}}{m_{pi}}$ $n_{cci}; m_{cci}$ = Integer division ranks used by the short PN code generator No. $i$.

$R_{ci} = fref \times \dfrac{nc_{ci}}{mc_{c}i}$ $n_r; m_r$ = Division ranks used by the reference signal generator.

$f_{ref} = f_{osc} \times \dfrac{n_r}{m_r}$ $P_{ei}$ = Power of the signal transmitted at point $A_{ei}$.

$Y_{ei}$ = Time expression of the signal transmitted at point $A_{ei}$.

$\varphi_{ei}$ = Phase of the carrier transmitted at point $A_{ei}$.

$Y_{ei} = \sqrt{2P_{ei}} \cos(2\pi f_i t + \varphi_{ei}) \cdot C_{ci}(t) \cdot D_i(t)$.

$\Delta\tau_i PA_e$ = Group propagation time between points $A_{ei}$ and $P_{c_{ci}}$.

For example, the following are possible values of the fundamental parameters of the beacon and the transmitted reference signal:

$f_{ref}$ = 10.23 MHz.

$F_{osc}$ = 10.23 or 10 MHz.

$f_1$ # S band (2025 – 2110 MHz), or X band (7145 – 7235 MHz).

$f2$ # UHF band (401 – 403 MHz) or L band (960 – 1215 MHz or 1559 – 1610 MHz or 1613, 8 – 1626.5 MHz, or S band (2025 – 2110 MHz).

$R_{Cc1}$ # 1.023 Mbribes/s.

$R_{Cc2}$ # 1.023 or 0.511 Mbribes/s.

$R_{D1}$ = 50 bits/s or 500 bits/s.

$R_{D2}$ = 50 bits/s or 500 bits/s.

-continued $N_{Ccl}$ # 1023

$N_{Ccl}$ # 1023 or 511.

Codes $C_{c1}$ and $C_{c2}$ may be identical. In this case, the $C_{c1}$ and $C_{c2}$ code generators shown in FIG. 2 are coincident. This then gives $\Delta\tau_{12}Pe=0$. Otherwise, the ratio between durations $T_{c1}$ and $Tc_2$ must be integer and if possible equal to 1. $C_{ci}$ codes are called reference codes.

For example, short PN codes may be GPS and/or GLONASS C/A codes. Data rate may for example be the rates of GPS signals (and/or GLONASS and/or RGIC—INMARSAT 3—signals). These examples of choices mean that existing technologies may be used for electronic circuits in ZZZ beacons and receivers, without any change or without very much change. This reuse may be useful to reduce the costs of beacons and receivers, by continuously maintaining a competitive framework based on the use of a standard radionavigation signal format.

The beacons in the system according to the invention are called ZZZ beacons.

Basic ZZZ beacons are dual frequency. However, single frequency beacons may be used within the ground segment of the system according to the invention.

Oscillators of basic ZZZ beacons are top quality quartz oscillators (OUS=ultra-stable oscillator). However, atomic clocks and/or hydrogen masers and/or cold atomic clocks may also be connected to it.

A dual frequency beacon connected to a very stable clock in the medium and long term equipped with a time calibration device, forms a time beacon.

Basic ZZZ beacons are connected to a microcomputer (internal or external) that programs some beacon parameters and checks that they are working correctly. The microcomputer is connected to local measurement sensors. There may be different types of sensors, for example:

Meteorological data sensors (for example pressure, relative humidity, temperature). For example these meteorological data may be used to:
determine measurement errors made by ZZZ receivers, caused by the atmosphere through which signals received by the said receivers travel,
centralize meteorological data for climate monitoring/forecasting purposes.

Unprocessed GNSS measurement sensors (pseudo-range, pseudo-velocity) or GNSS differential correction sensors. These data are used for relative navigation purposes (orbital or air) or for local differential navigation purposes (orbital, air or ship).

Clock coefficient sensors. Clock coefficients $\alpha_0$, $\alpha_1$, $\alpha_2$ are such that the difference $\Delta T$ between the clock beacon and the system time according to the invention is approximative by the following formula:

$$\Delta T(t) \# \alpha_0 \cdot (t_0) + \alpha_1 \cdot (t-t_0) + \alpha_2 \cdot (t-t_0)^2$$

where t is the current time and $t_0$ is the time at which clock coefficients are measured.

These clock coefficients may be measured by a GPS or GLONASS or GNSS2 receiver placed close to the beacon. These coefficients may also be determined independently by the processing center for the system according to the invention and retransmitted to some beacons, by a wire or radioelectric link. These coefficients may be broadcast by the message transmitted by time beacons (BT).

General condition sensors for the various components of the beacon so that failure can be remotely diagnosed from the control center for the system according to the invention.

Calibration sensors: this sensor periodically measures the various differential and/or absolute delays that occur in the time calibration of the beacon considered. These parameters are $\Delta\tau r1PAe$ and/or $\Delta\tau 2PAe$ and/or $\Delta\tau 12Ae$ and/or $\Delta\tau 12Pe$.

For dual frequency beacons, data originating from one or several types of sensors may be transmitted using the binary message D1, whereas data originating from other types of sensors may be transmitted using the binary message D2. Binary messages D1 and D2 may also be identical.

ZZZ beacons may be single frequency. Therefore they transmit the signal $Y_{e1}$ or $Y_{e2}$ depending on the case.

Figure 3:
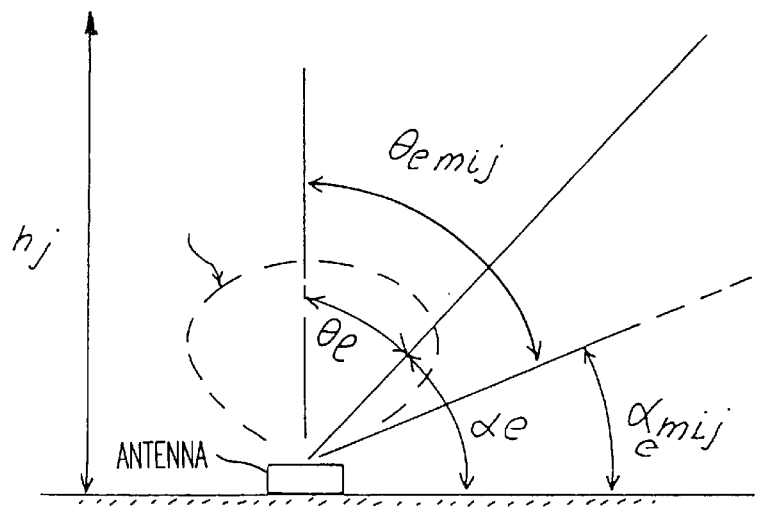
FIG. 3 illustrates the emission antenna parameters for reference beacons.

Reference beacons are also characterized by their transmission antennas described by the following parameters shown in FIG. 3:

$\alpha_e$=Satellite elevation angle as seen from the beacon, with respect to the local horizontal.

$\alpha_{emij}$=Minimum angle of elevation considered with respect to the local horizontal, for frequency i and satellite altitude hj.

$\theta_e$=Angle of sight of the satellite, measured from the local vertical.

$\theta_{emij}$=Maximum angle of sight considered for frequency i and the satellite altitude hj.

$G_{ei}(\theta_e)$=Gain of the emission antenna for an angle of sight $\theta_e$ and for frequency i.

Reference antennas are dual frequency and not very directive; they have a hemispherical type diagram. It may be possible to partially compensate for the degradation in the connection balance for low angles $\alpha_e$. Ideally, it will have a symmetry of revolution with respect to the local vertical. The antenna is adapted to the emission of signals with circular polarization. Its phase center is well identified.

The carrier frequency (or one of the carrier frequencies) associated with some local autonomous cells of beacons and receivers may be different from the frequencies $f_1$ and $f_2$ described above, if the said cells do not need to be completely radioelectrically connected to the master or client satellites. In this case, the specific frequency of the local autonomous cells is denoted $f_3$.

The system according to the invention also includes a subcategory of beacons, called precision beacons. These beacons simultaneously emit a signal $Y_{eiP}$ including short codes $C_{ci}$ and long codes denoted $C_{Li}$. These long codes are called precision codes. For example these codes could be GPS and/or GLONASS type P codes.

For equal total transmitted power, interference of this type of signal is more difficult than for short codes, interference of the said short codes being more difficult than in the case of a narrow band modulation.

These beacons may have an antenna with a hemispherical diagram, as in the case of reference beacons, or may have a diagram with a high directivity for orbitography and ultra-precise synchronization applications concerning geostationary satellites.

The clock connected to a precision beacon may be an atomic or Maser clock or a cold atomic clock, if this beacon is on the ground.

Precision beacons may also be connected to a cold atomic clock mounted on an orbiting satellite. If this satellite is also equipped with ZZZ receivers adapted to reception of signals transmitted by precision beacons located on the ground (co-located with ZZZ receivers), then a subsystem for precise monitoring of the drift of an orbiting cold atomic clock is obtained.

Precision beacons are connected to a clock with a long term stability at least as precise as the stability of an atomic clock, and are therefore particular time beacons.

The ZZZ subsystem composed of directive precision beacons and associated receivers is called "ZZZ-Time".

$$Y_{eip} = \sqrt{2P_{ei}} \cos(2\pi f i t + \varphi_{ei}) \times C_{ci}(t) \times Di(t) +$$
$$a_i \sqrt{2P_{ei}} \sin(2\pi f i t + \varphi_{ei}) \times C_{Li}(t) \times Di(t)$$

The coefficient $a_i$ represents the relative amplitude of the signal component $Y_{eip}$ containing the long code, modulating the carrier $f_i$ in quadrature.

If the beacon is highly directional, frequencies $f_i$ may be different from the frequencies associated with the reference beacons, in order to prevent interference of these reference beacons.

Similarly, if a satellite receiving signals from precision beacons on the ground includes an onboard precision beacon, the frequencies $f_i$ associated with the latter beacon must not be the same as the frequencies associated with the said precision beacons on the ground. This prevents interference between uplinks and downlinks.

$R_{Li}$ = Rate of the long code modulating the $f_i$ carrier.

$N_{Li}$ = Number of bribes in the long code.

$T_{Li}$ = Duration of the long code.

$n_{CLi}$ = Integer ratio between the rate of the $C_{Li}$ and $C_{ci}$ codes.

For example, these parameters may be such that:

$R_{Li}$ = 10.23 or 5.11 Mbribes/s $n_{CLi} = R_{Li} / R_{ci} = 10$ $T_{Li}$ = One week.

The Di message sent by precision beacons comprises a periodically updated time counter. The date contained in the counter is used to preset the precision code acquisition circuit.

Figure 4:
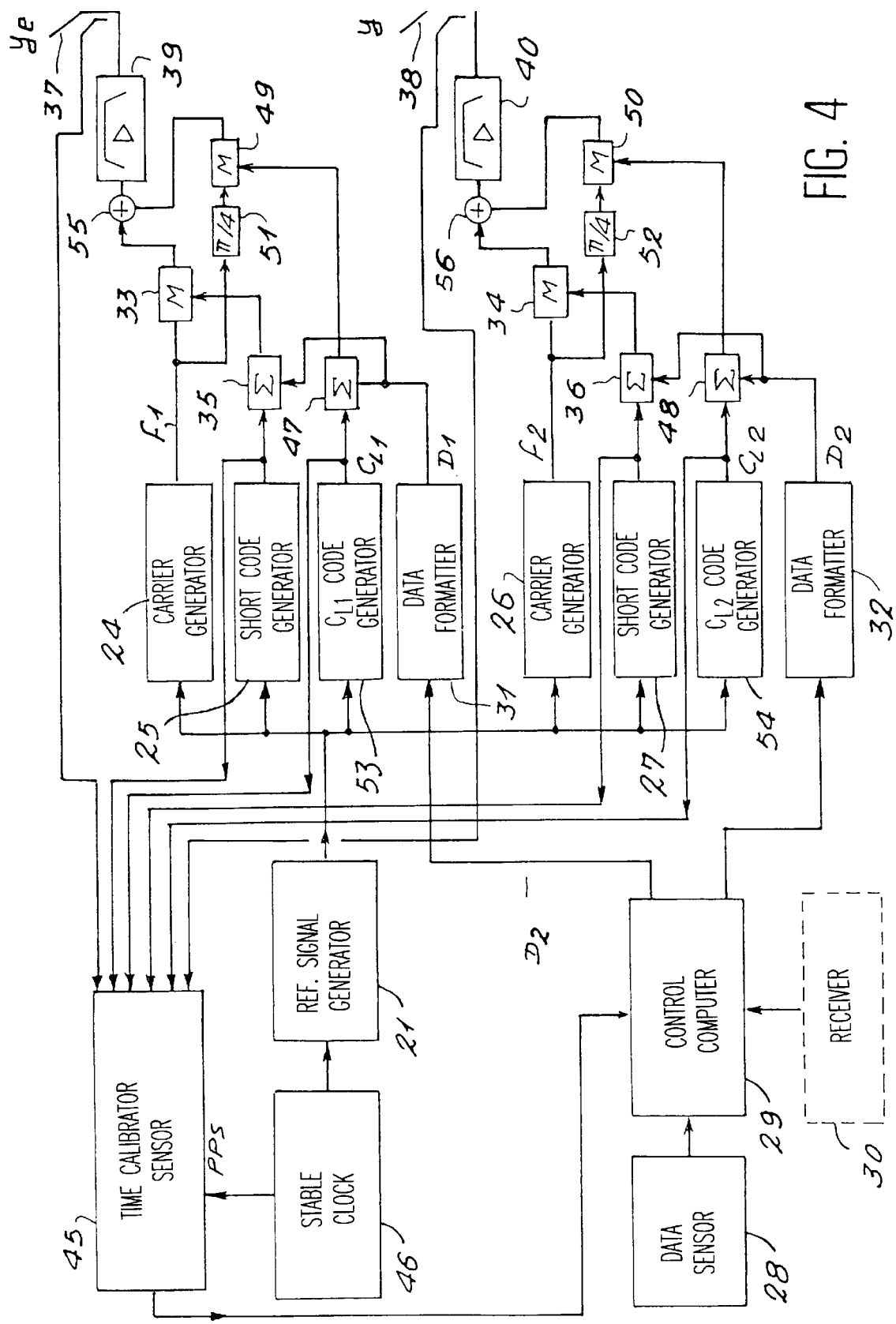
FIG. 4 diagrammatically illustrates a precision beacon.

A precision beacon may be made as shown in diagram in FIG. 4.

This Figure contains a number of elements already shown in FIG. 2; they are shown here with the same references.

It also contains the following new elements:

a time calibrator sensor 45;

a very stable clock 46;

two integrators 47, 48;

two modulators 49, 50;

two π/4 phase shifters 51, 52;

two CL1 and CL2 code generators 53, 54;

two adders 55, 56.

If a precision code is required particularly for interference resistance purposes, it is not strictly necessary for the precision beacon to transmit this code on frequencies $f_1$ and $f_2$ at the same time.

In a variant of the system according to the invention, some master beacons may be precision beacons.

Figure 5:
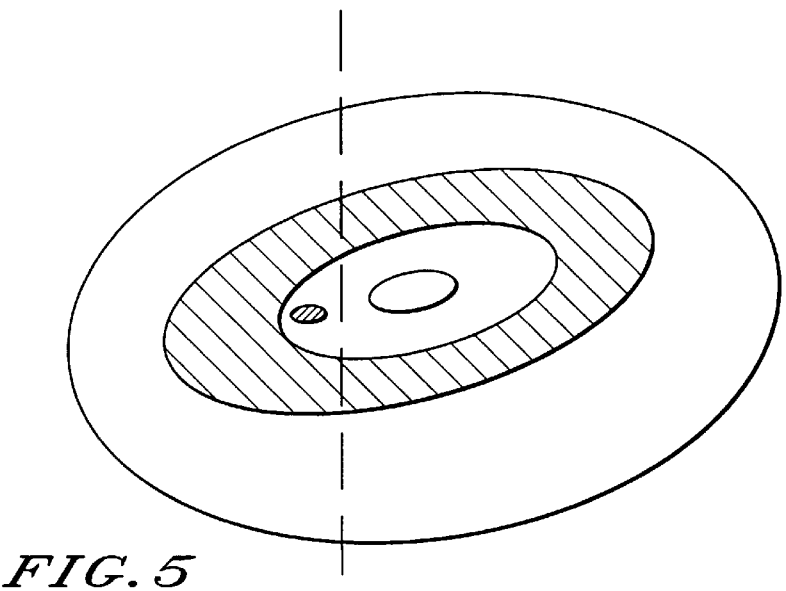
FIG. 5 illustrates a summary diagram of the various types of ZZZ beacons.

FIG. 5 illustrates a summary diagram showing the various types of ZZZ beacons (the cross hatching represents the ZZZ reference system according to the invention (basic version); the rest of the Figure shows the potential for improvements to the basic version.

Figure 6:
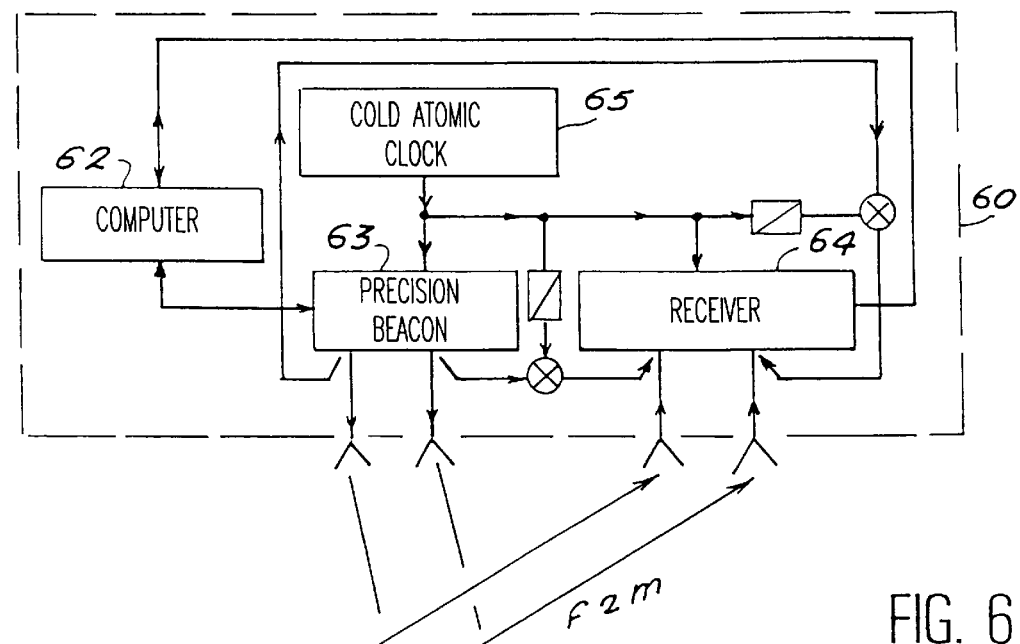
FIG. 6 illustrates a precise subsystem for measuring the drift of cold atomic clocks mounted on a satellite.
Figure 6:
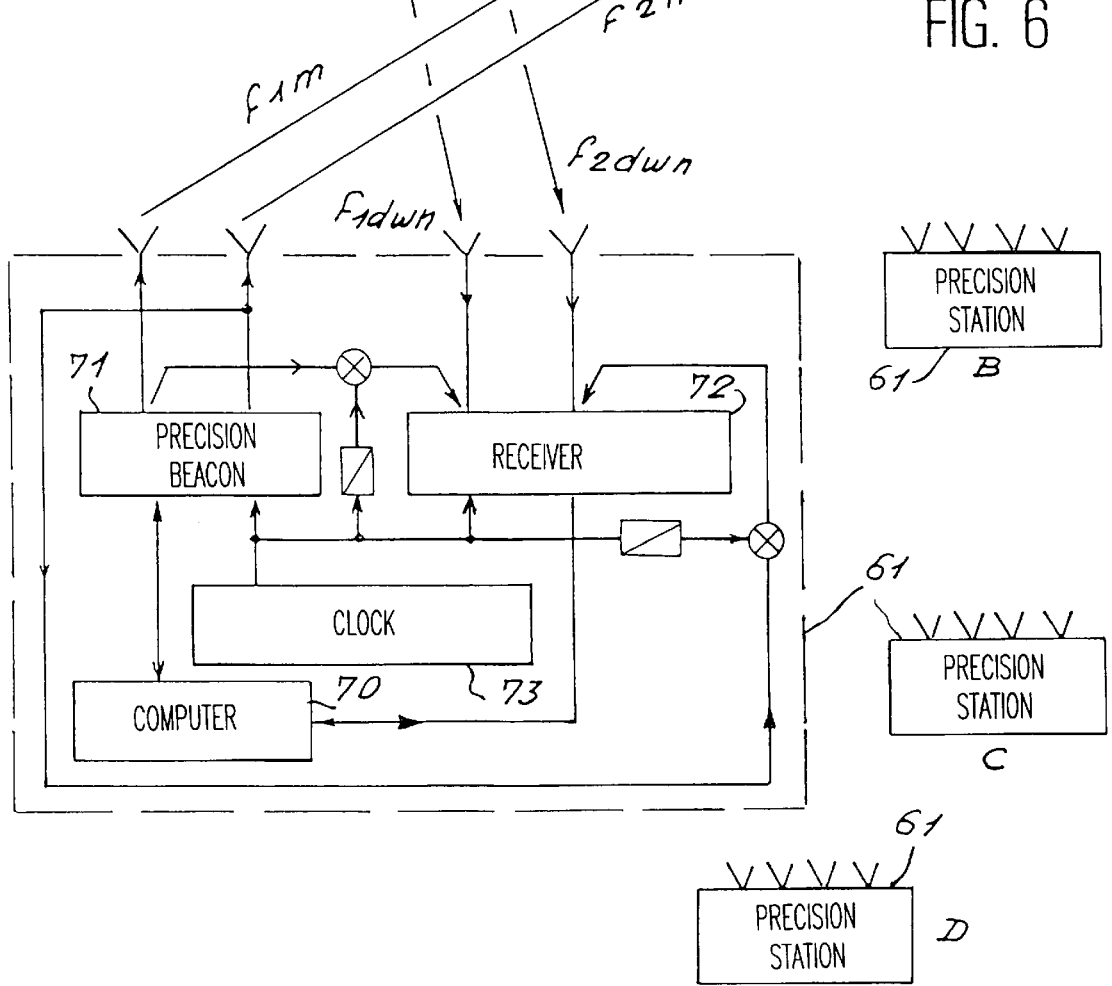

FIG. 6 illustrates a subsystem for precise measurement of the drift of a cold atomic clock mounted on a satellite. The drift of the said clock is monitored very closely if the satellite is geostationary.

This Figure shows firstly a satellite 60, and secondly precision stations 61. The satellite 60 comprises a computer 62 linked to a precision beacon 63 and a precision receiver 64, and a cold atomic clock 65.

Each station 61 comprises a computer 70 linked to a precision beacon 71 and a precision receiver 72, and to an atomic or hydrogen maser clock 73.

The onboard and ground antennas in this subsystem are directional.

Figure 7:
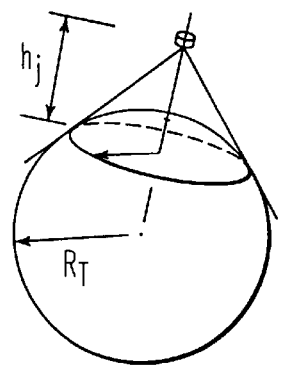
FIG. 7 illustrates a visibility circle for a satellite at altitude $h_i$.

The system according to the invention is also characterized by rules for the assignment of pseudo-random codes on beacons. These rules consider the concept of a visibility circle. A visibility circle surrounds the part of the earth's surface visible from a satellite at altitude $h_j$ as shown in FIG. 7.

A visibility circle $C_j$ is characterized by its center located on the surface of the earth vertically below the satellite, and by its area $$Sj = 2\pi \left( \frac{h_j}{R_T + h_j} \right) \times R_T^2$$

where $R_T$ is the land radius.

The ratio of the area of visibility circles associated with $h_i$ and $h_j$ is also defined and is denoted $R_{sij}$:

$$R_{sij} = \frac{h_j(R_T + h_i)}{h_i(R_T + h_j)} \text{ where } h_j > h_i$$

Visibility circles are also associated with beacons. These circles are the same as defined above and are centered on the beacon. It is assumed that the satellite is vertically in line with the said beacon.

Figure 8:
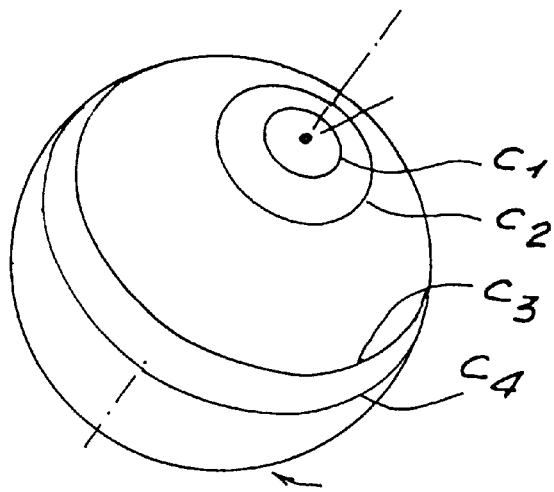
FIG. 8 illustrates four visibility circles.

FIG. 8 shows four visibility circles ($C_1$, $C_2$, $C_3$, $C_4$) corresponding to altitudes $h_1$, $h_2$, $h_3$ and $h_4$.

It will be seen that the radii of circles $C_3$ and $C_4$ are similar, although the associated altitudes $h_j$ are different. Therefore this gives $R_{s34}$ #1. This comment remains valid for orbits with altitudes exceeding $h_4$.

The circles of visibility participating in the sizing of the system according to the invention are therefore of type $C_1$, $C_2$ and $C_4$ in the first order.

The basic rule for building up the network of ZZZ beacons is as follows: "two beacons assigned with an identical code and which must nominally be tracked by the same satellite must be separated by a range exceeding the diameter of the visibility circle associated with the said satellite". This rule prevents interference between two identical PN codes.

Figure 9:
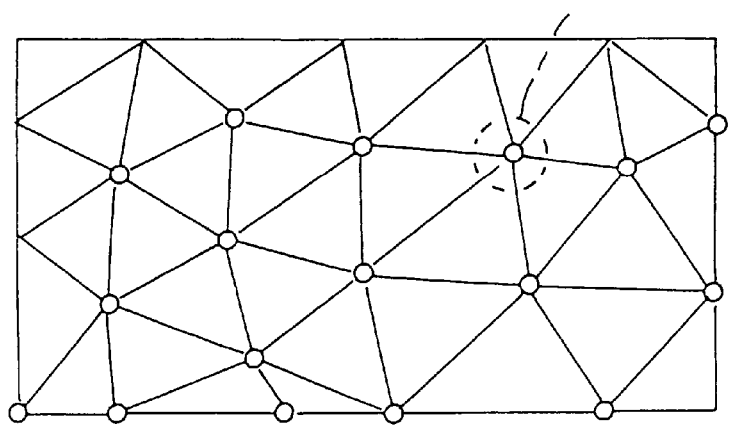
FIGS. 9 and 10 illustrate the composition of a set of wide spectrum beacons.
Figure 10:
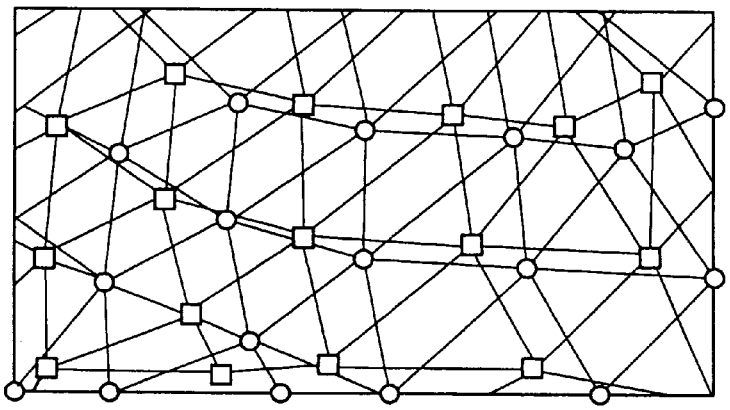

FIGS. 9 and 10 illustrate the composition of a set of wide spectrum beacons, for example with a system with two pseudo-random codes. There are two types of beacons in this example using the composition rule described above:

beacons identified by the PN code denoted "○", beacons identified by the PN code denoted "□"

The rule for building up the network is as follows: two beacons of the same type must be separated by a range equal to or greater than the diameter of the visibility circles $C_j$ within which the said beacons may be used. FIG. 9 illustrates the composition of the first sub-network representing the said rule. FIG. 10 illustrates the composition of all units by adding the second sub-network respecting the said rule.

The rule for making up the beacons network must be respected even more strictly in the special case in which each beacon is associated with a code different from all other codes (special case of the system according to the invention).

The following complementary notations are defined:

| | |
|---|---|
| $N_{ij}$ = | Total maximum maximorum number of ZZZ beacons transmitting simultaneously at frequency $f_i$ in a $C_j$ visibility circle. This number is defined by the required performance for the system according to the invention. It depends essentially on the link and measurment error balances. |
| $N_{ijo}$ = | Maximum maximorum number of orbitography beacons transmitting at frequency $f_i$ in a $C_j$ circle. |
| $N_{ijot}$ = | Typical maximum number of orbitography beacons transmitting at frequency $f_i$ in a $C_j$ circle. |
| $N_{ijou}$ = | Typical maximum number of orbitography beacons transmitting at frequency $f_i$ usable in a $C_j$ circle. |
| $N_{ijct}$ = | Typical total maximum number of client beacons transmitting simultaneously at frequency $f_i$ in a $C_j$ visibility circle. |
| $N_{ijc}$ = | Total maximum minimorum number of client beacons transmitting simultaneously at frequency $f_i$ in a $C_j$ visibility circle. |
| $C_{oi \cdot k}$ = | Number of the k(th) PN code associated with an orbitography beacon for frequency $f_i$. |
| $N_{Ma}$ = | Total number of master beacons. |
| $N_{Mj}$ = | Number of master beacons within a $C_j$ circle. |
| $N_{io}$ = | Total maximum number of orbitography beacons transmitting at frequency $f_i$ on the earth's surface. |
| $N_{iot}$ = | Typical maximum number of orbitography beacons transmitting at frequency $f_i$ on earth. |
| $\tau_o$ = | Attenuation index of the density of the network of orbitography beacons due to the presence of oceanic areas without islands or floating barges or carrier ships. |

Example of PN code assignments

In this example, we will consider beacons transmitting at a frequency of less than frequency $f_1$.

It is assumed that a circle $C_2$ does not contain more than eight orbitography beacons. Consider the case in which $N_{12o}=8$.

According to the basic rule, the PN codes associated with these eight beacons are all different. These codes are denoted $C_{o1.1}$, $C_{o1.2}$, $C_{o1.3}$, $C_{o1.4}$, $C_{o1.5}$, $C_{o1.6}$, $C_{o1.7}$ and $C_{o1.8}$.

We deduce the average number $N_{11om}$ of orbitography beacons in circle $C_1$. This number is given by the following relation:

$$N_{11om} = \frac{N_{12ot}}{R_{S12}}$$

$R_{S12}=1.88$, where $h_1=400$ km, hence $N_{11om}=4.25$.

This should provide sufficient coverage of orbitography beacons so that satellites in low orbit can observe at least four beacons.

Therefore we can write: $N_{11o} \geq N_{11ot} \geq 4$.

This number of four beacons is chosen to enable feasibility of autonomous attitude detection applications at type $h_1$ altitudes, and fast convergence of specific ZZZ navigators onboard at this altitude. ZZZ receivers dedicated uniquely to navigation/attitude applications may be equipped with a low precision/low cost oscillator such as a TCXO. The drift of ZZZ beacon clocks may be considered as being negligible compared with drift of a TCXO during the self-initialization process (or even in nominal mode).

The slope of this TCXO by an onboard navigation filter (ZZZ navigator) can thus be tracked almost instantaneously, even in low orbit.

Therefore a sufficiently dense network (such as $N_{1ot} \geq 4$) opens up applications for using the system according to the invention in low orbit, which were previously excluded for systems such as the current DORIS system (risk of network saturation at this density in the presence of positioning beacons) and PRARE (PRARE ground station too complex, at prohibitive cost to achieve such densities).

At the present time these applications are only possible for GPS and GLONASS systems.

Furthermore, a sufficiently dense network of simultaneously accessible beacons could enable precise orbitography of satellites in low orbit for the purposes of carrying out studies on the field of gravity at corresponding altitudes, without the need to add spatialized beacons on the said satellites; these beacons assumed to be tracked by satellites in a higher altitude orbit, without it being necessary to modify reference receivers to track the said beacons in orbit.

Furthermore, it is assumed that it is required to be able to simultaneously track seven orbitography beacons per $C_3$ or $C_4$ circle. These seven beacons are not all strictly necessary to achieve the required navigation precision, but they provide a degree of redundancy and enable RAIM (Receiver Autonomous Integrity Monitoring). Therefore, we have $N_{4ou}=7$. The basic ZZZ system advantageously uses the same type of ground beacons (antenna diagram, transmitted power, etc.) for all orbit types, including geostationary orbits and geostationary transfer orbits. A distinction is made between beacons solely by using their pseudo-random code and their identification number.

The $C_{o1.1}$ to $C_{o1.8}$ codes defined above are not obviously usable, since each of them is located in the same $C_4$ circle at the same time. We obtain $R_{S24}$ #7.5 for $h_2=800$ km and $h_4=36,000$ km.

Therefore the PN codes of the seven beacons observable from C3 or C4 circles must be different from the $C_{o1.1}$ to $C_{o1.8}$ codes. These new PN codes are called $C_{o1.9}$, $C_{o1.10}$, $C_{o1.11}$, $C_{o1.12}$, $C_{o1.13}$, $C_{o1.14}$ and $C_{o1.15}$. Therefore, we obtain:

$$N_{14ot}=N_{12ot} \times R_{S24}+N_{14ou}$$

$$N_{14ot}=7.5 \times 8+7$$

$$N_{14ot}=67.$$

The $C_{o1.9}$ to $C_{o1.15}$ codes can also be observed by all satellites located at altitudes less than $h_3$ or $h_4$, and therefore even more so for satellites in heliosynchronous orbit $h_2$ or low orbit $h_1$.

The average number of $C_{o1.9}$ to $C_{o1.15}$ codes observable in a $C_2$ circle is such that:

$$M \# \frac{R_{S24}}{N_{14ou}} = \frac{7.5}{7} \# 1$$

In order to limit the value of $N_{12o}$, and therefore to guarantee a minimum value for $N_{12c}$, the maximum number of orbitography beacons for which the code is between $C_{o1.9}$ and $C_{o1.15}$ in a $C_2$ circle is limited to m=2:

$$N_{12o}=N_{12ot}+m$$

$$N_{12o}=8+2=10.$$

The network of orbitography beacons must include at least $N_{4M}=2$ master beacons per $C_4$ visibility circle (one reference master beacon and one hot redundant master beacon). Each must transmit specific information to satellites (masters or clients) in a geostationary orbit, between passes of some orbiting satellites. Therefore PN codes associated with the master beacons should be between $C_{o1.9}$ to $C_{o1.15}$. Therefore the number $N_{14ou}$ (=7) contains the master beacons.

The $C_{o1.1}$ to $C_{o1.15}$ codes are all orthogonal with each other.

Figure 11:
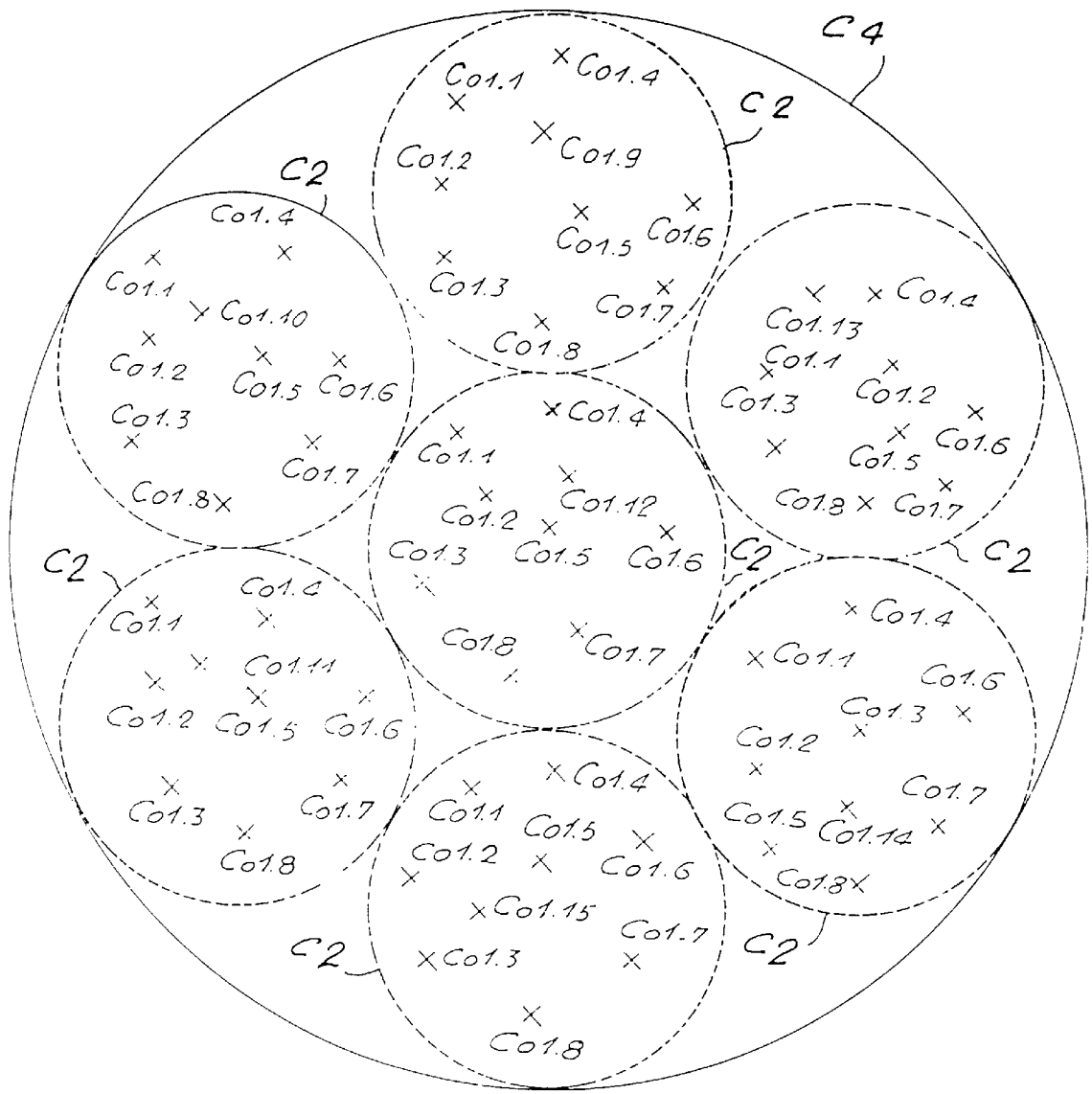
FIG. 11 illustrates an example assignment of ZZZ orbitography beacon codes.

FIG. 11 illustrates an example assignment of ZZZ orbitography beacon codes.

The total number of master beacons $N_M$ is therefore at least:

$$N_{Ma} = \frac{S_T}{S_4} \times N_{4M}$$

where $S_T$ is the surface of the earth, $S_T = 4\pi R_T^2$, $N_{Ma}\#2.35\times2\#5$.

ZZZ master beacons may be installed gradually. Two or three master beacons may be sufficient to cover the needs of satellites placed in orbits with $h_2$ type altitude and geostationary satellites associated with visibility areas in which these two or three beacons are located. The need to increase the number of master beacons with respect to this initial configuration is partly to provide total coverage of the geostationary orbit, and partly because of the small number of contacts of satellites in low orbit ($h_1$ type altitude) with a specific master beacon. These beacons are linked to the system time according to the invention, which is itself linked to an international time reference such as UTC. They may be used to relate onboard clocks to a known time reference (onboard-ground synchronization). The increase in the number of master beacons (and/or time beacons linked to a time reference) above the said initial configuration can also reduce the self-initialization time of onboard orbital navigators in ZZZ receivers onboard orbiting satellites.

The following notation is used:

$m_{ijo}$=Number of single frequency orbitography beacons transmitting at a frequency $f_i$ in a $C_j$ circle.

$b_{jo}$=Number of dual frequency beacons in a $C_j$ circle.

Therefore, we obtain:

$$n_{ijo}=b_{jo}+m_{ijo}$$

In the example described above, we assumed that a $C_2$ circle does not contain more than eight orbitography beacons transmitting at frequency $f_1$, namely:

$$N_{12o}=b_{2o}+m_{12o}\leq 8$$

Similarly, we assumed that the number of orbitography beacons transmitting at frequency $f_1$ contained in a $C_1$ circle is equal to at least 4, whenever possible according to the land geography (namely away from ocean areas without any islands), hence:

$$N_{11o}=b_{1o}+m_{11o}\geq 4$$

Consequently, A11, A21, A31 and A41 type needs can be well satisfied.

Similarly, in this example it is agreed that a $C_2$ circle must contain not less than four dual frequency orbitography beacons in order to satisfy A12, A22, A32 and A42 needs, and Bk needs of the scientific community. Therefore we obtain $b_{20}\geq 4$.

From the above inequalities, we can deduce a condition about the number of single frequency beacons transmitting at frequency $f_1$, in a $C_2$ circle: $0\leq m_{12o}\leq 4$.

This double inequality represents the various options for the frequency composition in the network of ZZZ beacons:

either all beacons are dual frequency ($m_{120}=0$)

or single frequency beacons "compensate" for the possible lack of beacons for satellites placed in low orbit ($h_1$ type altitude), assumed to use mainly single frequency ZZZ receivers for navigation and attitude detection applications.

In the example described above, we can estimate the maximum number of orbitography beacons transmitting at frequency $f_1$:

$$N_{1o}\#N_{14ot}\times S_T/S_4\#157$$

$$N_{1oi}\#\tau_0\cdot N_{1p}110 \text{ where } \tau_O\#0.7$$

It is assumed that deterioration of the $\tau_O$ factor is limited by:

installation of a number of orbitography beacons close to the earth's poles in order to satisfy need B10;

the installation of beacons on most islands with a good geographic distribution, or possibly even floating barges or ships.

The network of orbitography beacons may be set up gradually until their final number is reached in order to achieve the redundancy level for integrated operational use. The full operational capacity of the system could then be declared.

Client beacons

The numbers $N_{ijc}$ and $N_{ijct}$ of client beacons simultaneously transmitting within a $C_j$ circle are such that:

$$N_{ijct}=N_{ij}-N_{ijot}$$

$$N_{ijc}=N_{ij}-N_{ijo}.$$

However, the number of client beacons located within a $C_j$ circle may be much greater. Some beacons may only transmit on some days of the week. This is why a Week Word (WW) is defined with the following format:

$$WW = \boxed{b1}\boxed{b2}\boxed{b3}\boxed{b4}\boxed{b5}\boxed{b6}\boxed{b7} \quad (k \in \{1, \ldots, 7\})$$

where each bk value is a boolean associated with one day of the week. If one of these booleans is put in state "1", the beacon will transmit its signal throughout the day associated with this boolean. If another boolean is in state "0", the beacon will be put in standby mode throughout the corresponding day.

Client beacons close to each other designed to form a mesh on the ground (to satisfy geodesy, geodynamic and geophysical needs at the local scale (B9 type needs) all have the same week word (WW). This means that a set of beacons forming a mesh over an area to be monitored can transmit simultaneously. Although these beacons are very close to each other, they do not mutually interfere due to multiple access by code distribution (AMRC). The precision of positioning relative to dual frequency ZZZ beacons forming a terrain mesh is excellent because transmissions are simultaneous. This accumulates a large number of unprocessed measurements made onboard observer satellites. It also becomes possible to use interferometric techniques using received carrier phases, similar to techniques used in geodesy and detailed geophysics used on the GPS system.

Terrain deformations may be monitored very precisely using an earth observation satellite carrying a ZZZ receiver and a synthesis aperture radar (SAR), so that radar interferometry techniques can be applied. The system according to the invention supplies the orbit of the satellite carrying the radar and the relative and absolute positioning of beacons forming a mesh over the terrain to be monitored. It provides detailed monitoring of the change of these positionings with time.

These positionings may be more precise than is possible using current GPS, GLONASS, DORIS and PRARE systems.

Interferometric images of the SAR radar provide terrain deformation curves.

Coupling between the ZZZ system and SAR radar can advantageously be used for monitoring and possibly predicting natural risks (earthquake, volcanic eruption, etc.). This satisfy need B9.

FIG. 12 illustrates an SAR radar interforemetric image with terrain deformation curves 80 and detailed variations of the position of a client beacon 81, integrated into a terrain mesh network.

Client beacons forming a mesh over a risk area may also be co-positioned with a seismic type sensor.

Some client beacons located on a site for a long period must be fully autonomous, including for their electrical power supply. The energy is derived from batteries recharged by solar panels, for example as shown in FIG. 13. In this case, it may be necessary to distribute the values of the seven week word booleans in order to program a charge and discharge cycle for power supply batteries for the beacon concerned.

FIG. 14 illustrates an example of the battery charge percentage as a function of time.

Week words for autonomous client beacons must be communicated to the control center of the system according to the invention.

The control center manages all week words respecting the following rule:

If $N_{ijgc}$ is the global number of client beacons that can transmit at frequency $f_i$ in a $C_j$ circle, then all booleans $b_{ki}$ of week words for client beacons i must be chosen such that:

$$\sum_{i=1}^{N_{jGc}} b_{ki} \leq N_{ijc}$$

for all values of k between 1 and 7.

Note that while $N_{jGc} \leq N_{ijc}$, there is no need to manage week words. All beacons connected to the mains power supply (i.e. with no battery charge or discharge problems) can have a week words such that:

$$W = \boxed{1}\boxed{1}\boxed{1}\boxed{1}\boxed{1}\boxed{1}\boxed{1}$$

PN codes assigned to client beacons must be chosen consistently with week word codes. Codes assigned to these beacons are denoted $C_{ci.1}$, $C_{ci.2}$, $C_{ci.3}$, . . . , $C_{ci.n}$, etc. They are all orthogonal with all $C_{oi.k}$ codes associated with orbitography beacons. Their selection process is quite similar to the selection of orbitography beacons.

The assignment number for each ZZZ beacon, contained in the transmitted data message, is not the same as the assignment number for all other beacons.

The advantage of single frequency beacons is defined as a function of the following economic data:

| | |
|---|---|
| $A_{CMB}$ = | Development cost for a single frequency beacon, if dual frequency beacons are already developed. |
| $C_{Mn}$ = | Recurrent cost of a single frequency beacon, for production of n beacons. |
| $N_M$ = | Number of beacons that do not strictly need dual frequency. |
| $C_{Bm}$ = | Recurrent cost of a dual frequency beacon, for the production of m beacons. |
| $N_B$ = | Number of beacons that have to be dual frequency. |

These single frequency beacons may be used advantageously, if:

$$\Delta C_{MB} + C_{M_{NM}} \cdot N_M + C_{B_{NB}} \cdot N_B \leq C_{B_{NB+NM}} (N_B + N_M).$$

Therefore a choice can be made between the different options for making up the frequency composition of the ground beacons network (RBS) if the number of beacons and the associated costs is known.

Space segment

Figure 15:
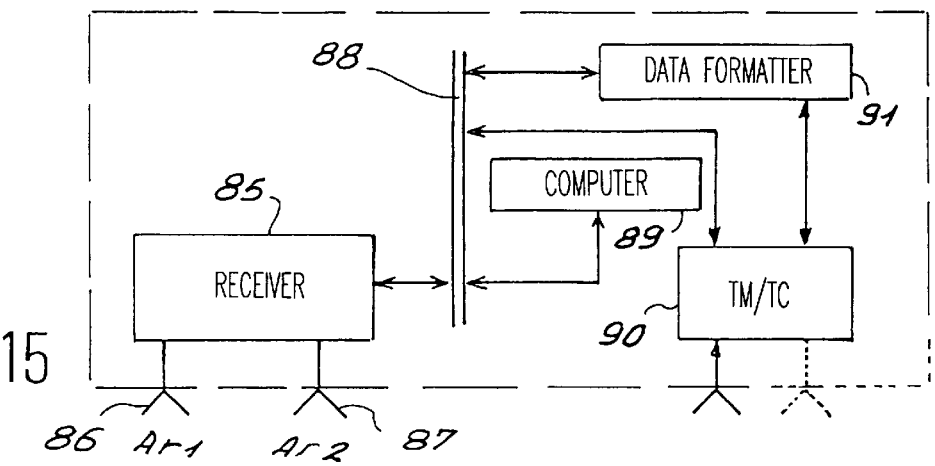
FIGS. 15, 16 and 17 illustrate several schemes for a master satellite.

FIG. 15 illustrates the scheme for a master satellite (SM).

Master satellites are equipped with a dual frequency ZZZ receiver 85 and two associated reception antennas 86, 87. This receiver is connected to the satellite data bus 88. This bus is connected to the onboard computer 89 responsible for managing the entire onboard system. A data formatter 91 is also connected to bus 88.

The bus is also connected to a data formatter interfaced with the remote measurements/remote control (TM/TC) transceiver 90. Unprocessed measurements and data captured by the ZZZ receiver are thus addressed to the TM/TC antenna which broadcasts them to the ground. Master receiver work plans are received in form of remote controls addressed to the receiver through the satellite data bus.

If the system according to the invention is used operationally for routine orbitography of the carrier satellite, the transceiver designed for remote control/remote measurements no longer necessarily needs to be a coherent transponder capable of making forward-return range (and/or Doppler) measurement in ground stations tracking the said satellite.

Therefore satellite transceivers and the said ground stations are simplified.

Figure 16:
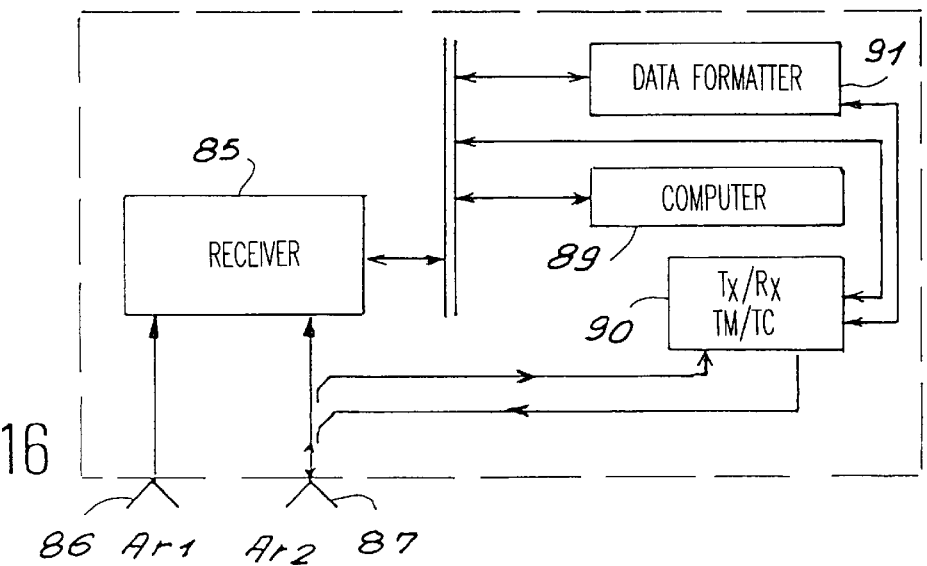
Figure 17:
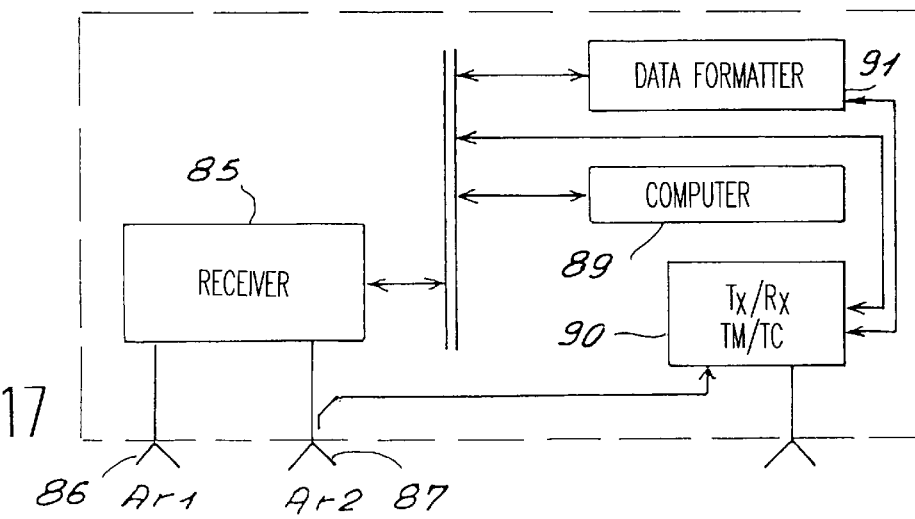

One of the frequencies of the system according to the invention may be located in the S band dedicated to remote control/remote measurements (2025–2110 MHz) . This frequency f1 may advantageously be chosen to ensure compatibility of the carrier satellite with the TM/TC transceiver antenna in the S band; the number of antennas for the said satellite may be reduced if the pass band of the S band antenna used is compatible with the TM/TC service bands used and with the f1 band of the system according to the invention. In this case the scheme used for the master satellite may be one of the types illustrated in FIGS. 16 and 17, elements identical to those in FIG. 14 being shown with the same references.

Client satellite

The scheme is basically the same as that for a master satellite, with the following exceptions:

the receiver may be a reference or precision single frequency of dual frequency receiver;

unprocessed measurements and data collected by beacons are not systematically transmitted to the ground, depending on the mission of the client satellite.

Figure 18:
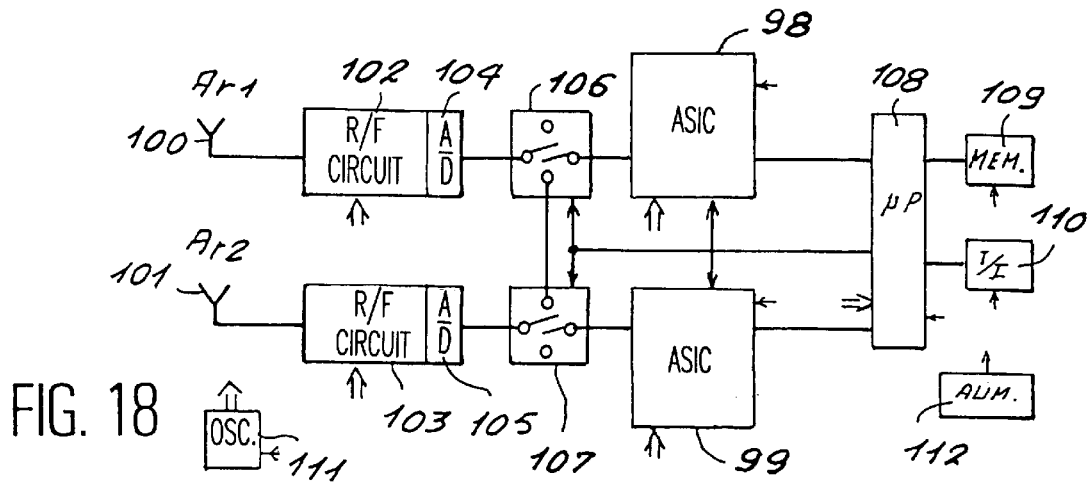
FIG. 18 illustrate the scheme for a basic ZZZ receiver.

FIG. 18 shows the scheme for a basic ZZZ receiver. This Figure shows two antennas 100, 101 each connected to an RF chip or hybrid 102, 103 and a analog/digital converter 104, 105, a digital switch 106, 107 and an ASIC component 98, 99 (see FIG. 18), a microprocessor assembly 108 connected to memories 109 at an interface 110. The microprocessor assembly 108 comprises a single microprocessor or two microprocessors or one microprocessor associated with a coprocessor.

This receiver also comprises a top of the range oscillator 111 and a power supply 112.

The ASIC may be multistandard; channels are programmable (if $C_{c1} \neq C_{c2}$) and can process the $C_{c1}$ and $C_{c2}$ codes. This scheme excludes cases of receivers of signals from GPS or GLONASS or GNSS1 satellites.

Figure 19:
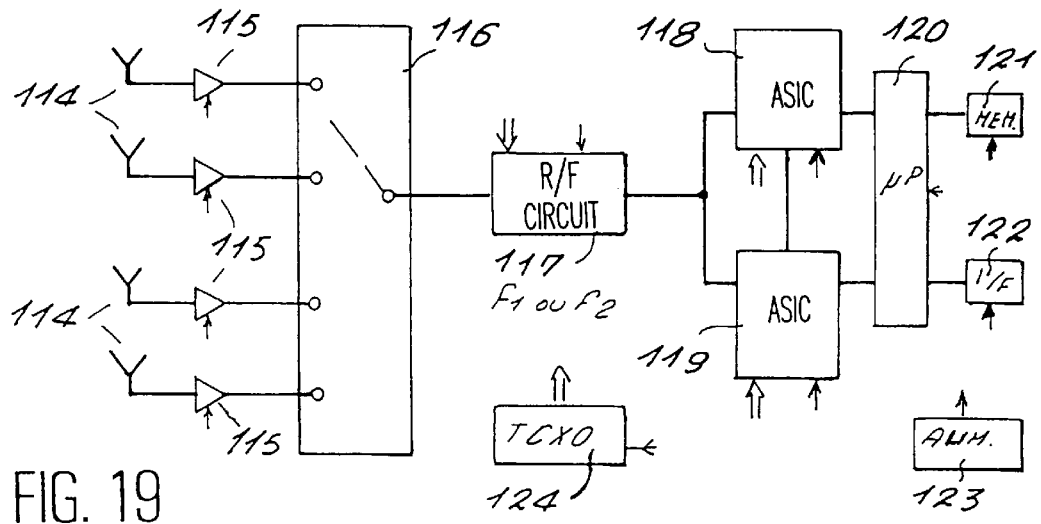
FIGS. 19, 20 and 21 illustrate two other types of ZZZ receivers.

FIG. 19 illustrates a low cost ZZZ receiver for navigation and attitude detection missions. This Figure shows antennas 114, amplifiers 115 connected to a fast programmable switch 116, an RF chip 117 ($f_1$ or $f_2$) connected to two n-channel single code $C_{ci}$ ASICs 118, 119, a microprocessor assembly 120, a memory assembly 121, an interface 122, a power supply 123 and a TCXO oscillator 124. This scheme excludes cases of receivers of signals from GPS or GLONASS satellites.

Figure 20:
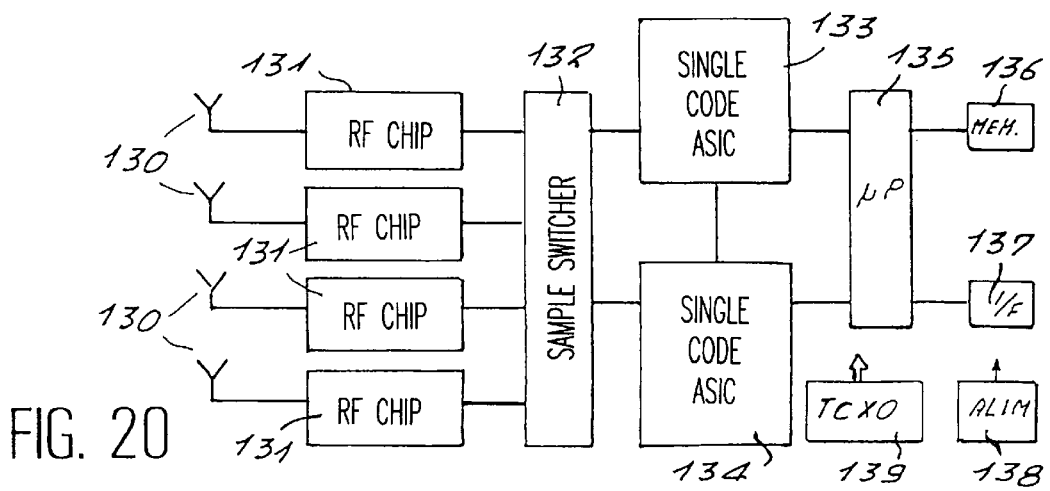

FIG. 20 illustrates a single frequency ZZZ attitude receiver for navigation and attitude missions. This Figure shows antennas 130, RF $f_i$ chips 131, a sample switcher 132, two n-channel single code $C_{ci}$ ASICs 133, 134, a microprocessor assembly 135, a memory assembly 136, an interface 137, a power supply 138 and a TCXO 139.

Figure 21:
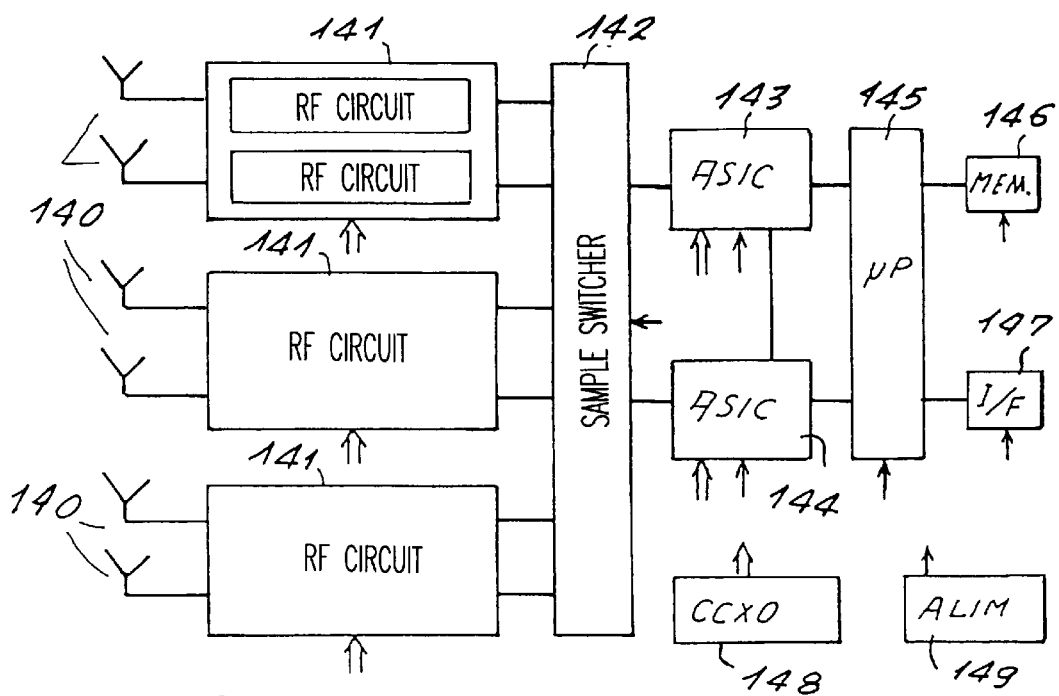

FIG. 21 illustrates a dual frequency ZZZ attitude receiver for navigation, orbitography and precision attitude detection missions. This Figure shows antennas 140, chips 141, a sample switcher 142, ASICs 143, 144, a microprocessor assembly 145, a memory assembly 146, an interface 147, an oscillator 148 and a power supply 149.

Each entity producing ZZZ receivers may make dual frequency receivers only, or single and dual frequency receivers depending on its optimization between development costs and market shares.

Figure 22:
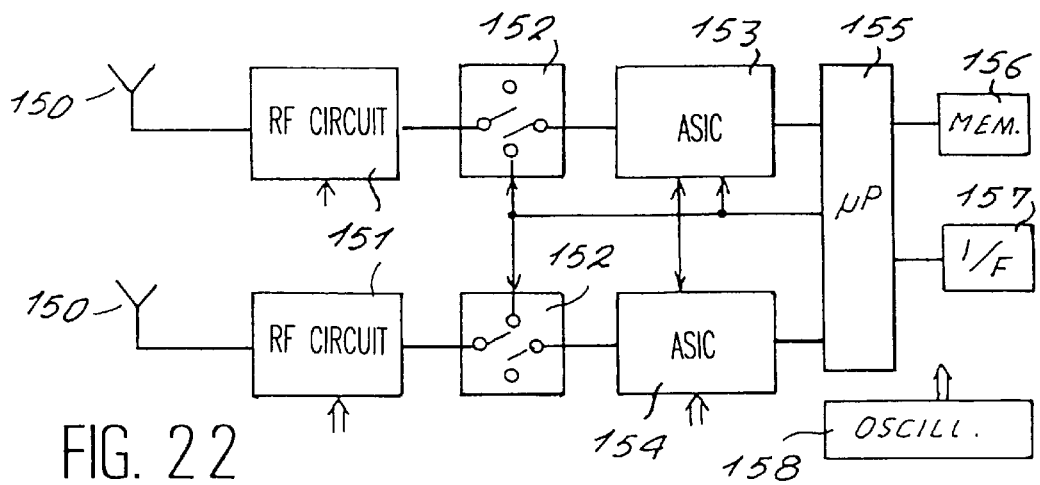
FIG. 22 illustrates a mixed basic GNSS-ZZZ receiver.

FIG. 22 shows a basic mixed GNSS-ZZZ receiver. This Figure shows antennas 150, $f_i$ chips 151, switches 152, ASICs 153 and 154, a microprocessor 155, a memory 156, an interface 157 and an oscillator 158.

fi=ZZZ frequency $f_1$, $f_{2 \text{ or } f3}$.

The associated reception channel processes a single frequency signal.

$f_k$=GPS or GLONASS or GNSS2 frequency.

The $C_{ck}$ codes are the GPS or GLONASS C/A codes or GNSS codes.

This receiver may satisfy needs $A_{11}$, $A_{12}$, $A_{13}$, $A_{14}$, $A_{31}$, $A_{32}$, $A_{33}$, $A_{34}$, $C_1$, $C_2$, $C_3$, $C_4$, $C_7$, $C_8$, $D_3$, $D_4$.

GNSS-ZZZ mixed receivers

Mixed receivers may be of the following types:

GLONASS-ZZZ;

GPS-ZZZ,

GNSS2-ZZZ, i.e. GNSS3.

These receivers cover maximum autonomous requirements for orbital applications.

Navigation/orbitography performances may be obtained even if only one of the two systems is used (satellite constellation in orbit or network of beacons on the ground).

For example, mixed receivers may be used by satellites for which the mission must take place in a period during which the satellite constellation used may change to "paying" mode from the C/A code or for associated data.

Furthermore, simultaneous visibility of these satellites and these beacons will enable very fast convergence times for onboard navigators, for putting or holding in position, and for improving the associated precision when the systems used are operational.

Mixed receivers may be used by strategically important satellites.

Mixed satellites may have the following configurations as a function of the switch arrangement:

a) 2n channels assigned to the system according to the invention;

b) n channels assigned to the constellation of satellites used, and n channels assigned to the system according to the invention;

c) 2n channels assigned to the constellation.

Configuration b) is essential for application types $C_1$, $C_2$, $C_3$, $C_4$, $D_3$.

Mixed dual frequency receivers (dual frequency GNSS3 receivers) are the optimum for scientific applications B1 to B10.

Figure 23:
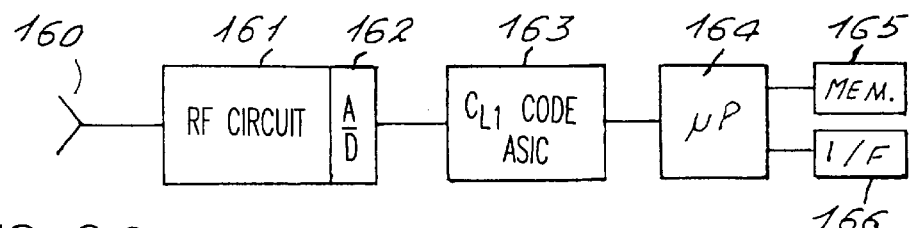
FIGS. 23 and 24 illustrate three examples of a ZZZ receiver adapted to attitude detection.
Figure 24:
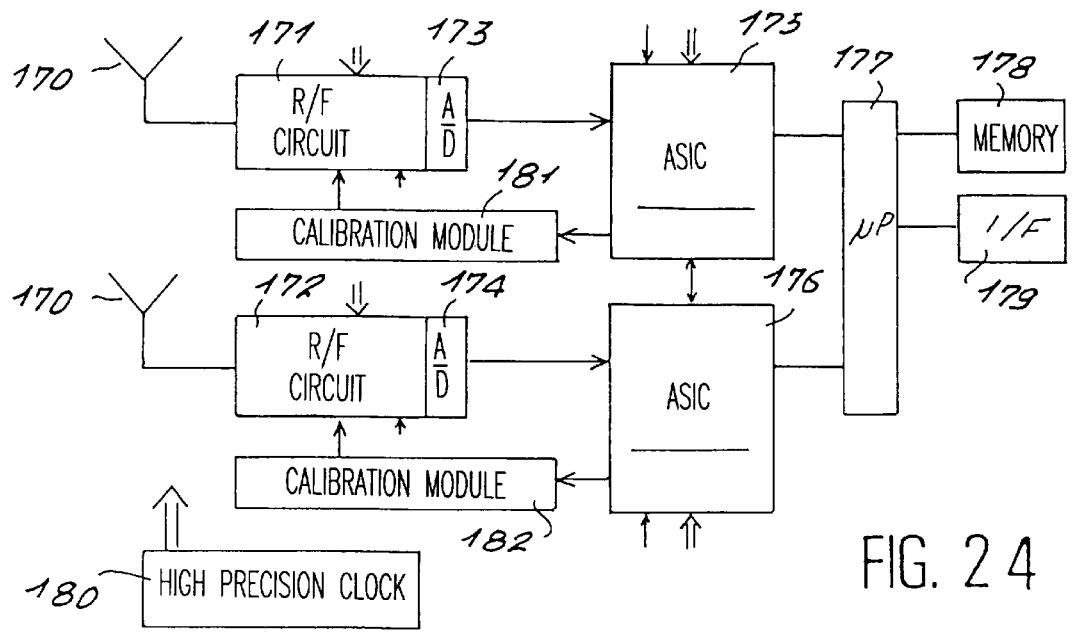

FIGS. 23 and 24 illustrate a low cost single frequency (navigation) ZZZ receiver and a precision reference ZZZ receiver, respectively.

FIG. 23 shows an antenna 160 followed by an RF $f_i$ chip 161, an analog-digital converter 162, a $C_{ci}$ code ASIC 163, a microprocessor assembly 164, a memory assembly 165 and an interface 166.

FIG. 24 shows antennas 170 followed by $f_1$ and $f_2$ RF chips 171, 172, two analog-digital converters 173, 174, two reference precision ASICs 175, 176, a microprocessor assembly 177, a memory assembly 178, an interface 179, a high precision clock 180. Each precision ASIC associated with frequency $f_i$ can process the $C_{ci}$ short code and the $C_{Li}$ long code. Two calibration modules 181, 182 are connected between each ASIC and the chip corresponding to it, respectively. The reference precision ZZZ receiver is adapted to processing of signals transmitted by precision beacons with an hemispherical type antenna diagram. ZZZ receivers dedicated to monitoring orbiting cold atomic clocks are fitted with precision ASIC modified from the precision reference ASICs, in order to reduce instrumental measurement noise originating from causes other than thermal.

Reception antennas

Satellites are also characterized by their reception antennas described by the following parameters:

| | |
|---|---|
| $\alpha_r =$ | Angle of elevation of the beacon seen from the satellite, with respect to the local horizontal. |
| $\alpha_{rmij} =$ | Minimum angle of elevation considered with respect to the local horizontal, for frequency i (i ∈ {1; 2}) and the satellite altitude $h_j$. |
| $\theta_r =$ | Angle of sight of the beacon with respect to the local vertical. |
| $\theta_{rmij} =$ | Maximum angle of sight considered for frequency i and satellite altitude $h_j$. |
| $G_{ri}(\theta_r) =$ | Gain of reception antenna for an angle of sight $\theta_r$ and frequency i. |

Reference reception antennas are dual frequency and have an hemispherical diagram for satellites with $h_1$ or $h_2$ type orbits, and consequently are not very directional. Ideally, there will be symmetry of revolution with respect to the local vertical.

The antenna is adapted to the reception of signals in circular polarization emitted by ZZZ beacons.

Figure 25:
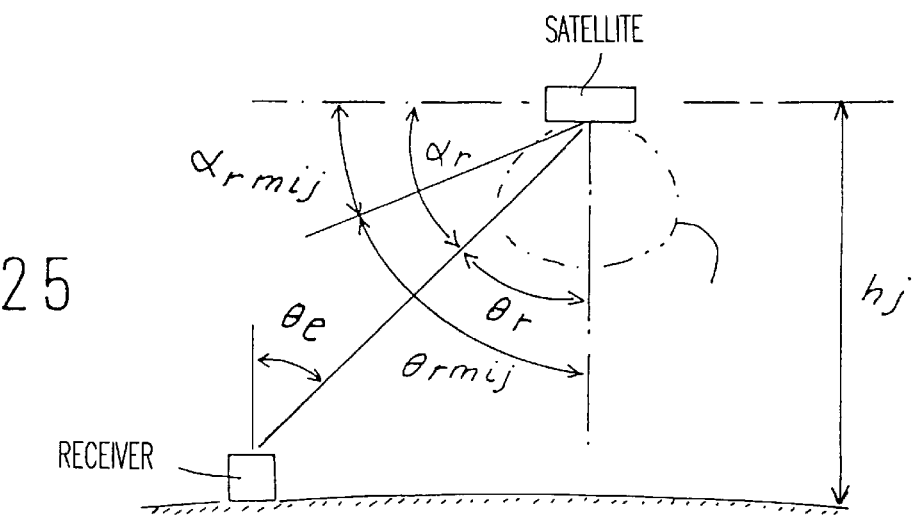
FIG. 25 illustrates operation of an antenna adapted to the case of a satellite in low orbit.

The diagram in FIG. 25 is suitable for the case of a satellite in low orbit.

Relations between angles α and θ characterizing the beacon-satellite line of sight are as follows:

For a satellite in low orbit ($h_1$ or $h_2$): $\theta_e \# \theta_r$ or $\pi/2 \# \alpha_e + \theta_r$.

The system is dimensioned respecting the following relation:

$\theta_{rmij} \# \theta_{emij}$, namely $\tau/2 \# \alpha_{emij} + \theta_{rmij}$.

In the general case for a satellite at any altitude (for example $h_1$ or $h_2$ or $h_3$ or $h_4$), we obtain:

$$\theta_e = a\sin\left[\frac{R_T + h_j}{R_T} \cdot \sin(\theta_r)\right]$$

$$\theta_{emij} = a\sin\left[\frac{R_T + h_j}{R_T} \cdot \sin(\theta_{rmij})\right]$$

In the case of geostationary satellites (or GNSS2 satellites) that are already in position, the reception antenna is directional such that its territorial coverage area is similar to the area covered by a $C_4$ (or a $C_3$) circle.

Furthermore, $A_{ri}$=phase center of the reception antenna for frequency $f_i$.

Performances of the ZZZ system

Figure 26:
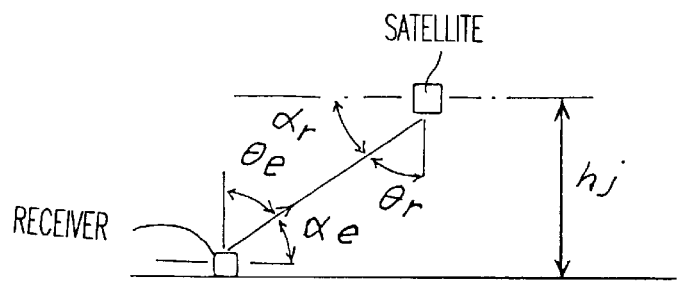
FIG. 26 illustrates a space link between a ZZZ beacon and a ZZZ receiver.

FIG. 26 shows space links between a ZZZ beacon and a ZZZ receiver.

The following notation is defined:

$C/No$ = Signal power ($C$) to spectral noise density ($No$) ratio.

$\left(\frac{C}{No}\right)_{th_{ij}}$ = $C/No$ ratio corrected to the antenna access due to thermal noise, for frequency $f_i$ and altitude $h_j$.

$\left(\frac{C}{No}\right)_{bse_{ij}}$ = Equivalent $C/No$ ratio due to other beacons transmitting simultaneously in a $C_j$ circle for frequency $f_i$.

$\left(\frac{C}{No}\right)_{bbe_{ij}}$ = Equivalent $C/no$ ratio due to narrow band interferers present in a $C_j$ circle for frequency $f_i$.

$\left(\frac{C}{No}\right)_{bbb_{ij}}$ = Equivalent $C/no$ ratio due to white noise of non-thermal origin present in a $C_j$ circle for frequency $f_i$.

$\left(\frac{C}{No}\right)_{eNb_{ij}}$ = Equivalent global $C/No$ ratio in environment without interference.

$\left(\frac{C}{No}\right)_{eb_{ij}}$ = Equivalent global $C/No$ ratio in environment with interference.

We obtain:

$$\left(\frac{C}{No}\right)^{-1}_{eNb_{ij}} = \left(\frac{C}{No}\right)^{-1}_{th_{ij}} + \left(\frac{C}{No}\right)^{-1}_{bse_{ij}}$$

$$\left(\frac{C}{No}\right)^{-1}_{eb_{ij}} = \left(\frac{C}{No}\right)^{-1}_{eNb_{ij}} + \left(\frac{C}{No}\right)^{-1}_{bbe_{ij}} + \left(\frac{C}{No}\right)^{-1}_{bbb_{ij}}$$

Other notations are defined:

C=speed of light=$3.10^8$ m/s $D_{ij}$=range between phase centers $A_{ei}$ and $A_{ri}$, associated with a satellite at altitude $h_j$.

The following approximation is used for the following calculations:

$$D_{1j} \# D_{2j} \# D_j$$

$L_{eij}$ = Attenuation in free space for frequency $f_i (L_e < 1)$ and altitude $h_j$.

$L_{ai}(\theta r)$ = Attenuation other than attenuation due to free space, for frequency $f_i$ ($L_a > 1$) and angle of sight $\theta_r$.

$$L_{eij} = \left(\frac{4\pi D_j f_i}{c}\right)^2$$

$k$ = Boltzman's constant = $1.379 \cdot 10^{-23}$ J/K $T_{ij}$ = System noise temperature corrected to the antenna access for frequency $f_i$ and altitude $hj$.

$No_{thij}$ = Thermal noise spectrum density corrected to the antenna access for frequency $f_i$ an altitude $h_j$.

$C_{ij}$ = Useful received signal power at the antenna access for frequency $f_i$ and altitude $h_j$.

$$C_{ij} = \frac{P_{ei} \cdot G_e(\theta_e) \cdot G_r(\theta_r)}{L_{eij}(D_j) L_{ai}(\theta_r)}$$

$$No_{thij} = K \cdot T_{ij}$$

$$\left(\frac{C}{No}\right)_{thij} = \frac{C}{No_{thij}}$$

In the best case, we obtain the following:

$$C_{ij} \text{ best case} = \frac{P_{ei} \cdot G_e(0) \cdot G_r(0)}{L_{eij}(h_j) L_{ai}(0)}$$

$$\left(\frac{C}{No}\right)_{thij \, best \, case} = \frac{C_{ij} \text{ best case}}{No_{thij}}$$

In the worst case we obtain:

$$C_{ij} \text{ worst case} = \frac{P_{ei} \cdot G_e(\theta_{emij}) \cdot G_r(\theta_{rmij})}{L_{eij}(D_j) L_{ai}(\theta_{rmij})}$$

and:

$$\left(\frac{C}{No}\right)_{thij \, worst \, case} = \frac{C_{ij} \text{ worst case}}{No_{thij}}$$

Furthermore, we obtain:

$$\left(\frac{C}{No}\right)_{bse_{ij} \, worst \, case} = \beta \cdot \frac{C_{ij} \text{ worst case}}{C_{ij} \text{ best case}} \cdot \frac{R_{ei}}{(N_{ij}-1)}$$

where:

$$\beta \# \frac{3}{2}$$

This calculation is pessimistic, since it assumes that the treated beacon is received in the worst case and that the ($N_{ij}$−1) other beacons transmitting simultaneously in the $C_j$ circle are received in the best case.

$$\left(\frac{C}{No}\right)_{bse_{ij}\, best\, case} = \beta \cdot \frac{C_{ij}\, best\, case}{C_{ij}\, worst\, case} \cdot \frac{R_{ci}}{(N_{ij}-1)}$$

This calculation is optimistic, since it assumes that the treated beacon is received in the best case and that the ($N_{ij}$–1) other beacons transmitting simultaneously in the $C_j$ circle are received in the worst case and:

$$\left(\frac{C}{No}\right)^{-1}_{eNb_{ij}\, worst\, case} = \left(\frac{C}{No}\right)^{-1}_{th_{ij}\, worst\, case} + \left(\frac{C}{No}\right)^{-1}_{bse_{ij}\, worst\, case}$$

$$\left(\frac{C}{No}\right)^{-1}_{eNb_{ij}\, best\, case} = \left(\frac{C}{No}\right)^{-1}_{th_{ij}\, best\, case} + \left(\frac{C}{No}\right)^{-1}_{bse_{ij}\, best\, case}$$

The parameters of the system according to the invention are selected such that:

$$\frac{\left(\frac{C}{No}\right)^{-1}_{eNb\, best\, case\, ij}}{\left(\frac{C}{No}\right)^{-1}_{eNb\, worst\, case\, ij}} \leq Mi$$

where Mi is the intercorrelation margin related to the $C_{ci}$ codes. This avoids interference between orthogonal $C_{ci}$ codes. An additional margin may be considered when the Doppler frequencies associated with the various codes are sufficiently remote from each other.

The parameters of the environment with interference are as follows:

$Nox_{ij}$ = Density of white noise (or equivalent) caused by industrial sources seen by the reception antenna, for frequency $i$ and altitude $h_j$.

$PbM_{ij}$ = Average power of strong narrow band interferers for frequency $i$ and altitude $h_j$ seen by the antenna.

$Pbm_{ij}$ = Average power of weak narrow band interferences for frequency $i$ and altitude $h_j$.

$\Delta FM_{ij}$ = Difference in average frequency between strong narrow band interferers for frequency $i$ and altitude $h_j$.

$\Delta Fm_{ij}$ = Difference in average frequency between weak narrow band interferers for frequency $i$ and altitude $h_j$.

The ratios $\left(\frac{C}{No}\right)_{bbe_{ij}}$ and $\left(\frac{C}{No}\right)_{bbb_{ij}}$ are calculated using the parameters mentioned above:

$$\left(\frac{C}{No}\right)_{bbb_{ij}} = \frac{C_i}{Nox_{ij}}$$

$$\left(\frac{C}{No}\right)^{-1}_{bse_{ij}} = \left\{2 \cdot \sum_{k=1}^{k=K_{M_{ij}}} \frac{PbM_{ij}\cdot sinc^2\left(\frac{k\cdot\pi\cdot\Delta FM_{ij}}{Rci}\right)}{C_{ij}\cdot Rci} + \frac{PbM_{ij}}{C_{ij}\cdot Rci}\right\} \cdot \frac{1}{\gamma} +$$

$$\left\{2 \cdot \sum_{k=1}^{k=K_{M_{ij}}} \frac{Pbm_{ij}\cdot sinc^2\left(\frac{k\cdot\pi\cdot\Delta Fm_{ij}}{Rci}\right)}{C_{ij}\cdot Rci} + \frac{Pbm_{ij}}{C_{ij}\cdot Rci}\right\} \cdot \frac{1}{\gamma}$$

where: $K_{MIJ} = E\left(\frac{R_{ci}}{\Delta F_{M_{IJ}}}\right)$ and $Km_{ij} = E\left(\frac{R_{ci}}{\Delta Fm_{ij}}\right)$ and $\gamma \# \frac{1}{2}$ where E designates the integer part of the fraction between parentheses and sinc is the cardinal sine function.

The parameters of the system according to the invention are also chosen such that:

$$\frac{\left(\frac{C}{No}\right)_{eNb\, best\, case\, ij}}{\left(\frac{C}{No}\right)_{eNb\, worst\, case\, ij}} \leq Mi$$

The frequencies f1 and f2 of the system according to the invention are chosen to maximize the $$\left(\frac{C}{No}\right)_{eb\, best\, case}, \left(\frac{C}{No}\right)_{eb\, worst\, case}, \left(\frac{C}{No}\right)_{eNb\, best\, case},$$

$$\left(\frac{C}{No}\right)_{eNb\, worst\, case},$$

is allowed by legislation for frequency band occupancy.

The following notations are introduced characterizing ASICs in reference ZZZ receivers.

$B_{bmij}$ = Unilateral range measurement noise band for frequency $f_i$ and altitude $h_j$.

$B_{npij}$ = Unilateral Doppler measurement noise band for frequency $f_i$ and altitude $h_j$.

$T$ = Doppler counting time.

$L_i$ = Internal losses of the receiver between the antenna input $A_{ri}$ and the access point to signal tracking loops, for frequency $f_i$.

$\sigma_{PD_{enbij}}$ = Standard deviation of the psuedo-range measurement noise (m) at frequency $f_i$, in an environment with no interference, for altitude $h_j$.

$\sigma_{PV_{enbij}}$ = Standard deviation of the psuedo-velocity measurement noise at frequency $f_i$, in an environment with no interference (m/s), for altitude $h_j$.

$\sigma_{P_{Debij}}$
and : are the corresponding standard deviations in an
$\sigma_{PV_{ebij}}$  environment with interference.

We obtain:

$$\sigma_{PD_{enij}} \# \frac{C}{R_{ci}} \sqrt{\frac{B_{nmij}}{2 \cdot \left[\left(\frac{C}{No}\right)_{enbij} \cdot \frac{1}{L_i}\right]} \cdot \left[1 + \frac{2 \cdot R_{Di}}{\left[\left(\frac{C}{No}\right)_{enbij} \cdot \frac{1}{L_i}\right]}\right]}$$

$$\sigma_{PV_{enbij}} \# \frac{C}{\pi \cdot fi \cdot T} \sqrt{\frac{B_{npij}}{\left[\left(\frac{C}{No}\right)_{enbij} \cdot \frac{1}{L_i}\right]} \cdot \left[1 + \frac{\cdot R_{Di}}{2\left[\left(\frac{C}{No}\right)_{enbij} \cdot \frac{1}{L_i}\right]}\right]}$$

The standard deviations $\sigma_{PD_{ebij}}$ and $\sigma_{PV_{ebij}}$ are calculated using formulas identical to the above formulas, replacing $$\left(\frac{C}{No}\right)_{enbij} \text{ by } \left(\frac{C}{No}\right)_{ebij}$$

Noise measurements due to oscillators are as follows:

$\sigma_{PDosc}$ = Standard deviation at 1 sigma of the psuedo-range measurement noise due to oscillators.

$\sigma PVosc$ = Standard deviation at 1 sigma of the psuedo-velocity measurement noise due to oscillators.

Noise measurements due to oscillators are calculated using the following parameters:

$\Delta F$ = Frequency difference (Hz).

$F$ = Central oscillator frequency (Hz).

The short term stability of the oscillator is denoted Si (i=b for onboard; i=S for ground.

The stability is determined on the Doppler counting duration T:

$$S_i = \left[\frac{\Delta F}{F}\right]_T$$

hence:

$\sigma_{PDosc} \# C.T.\sqrt{Sb^2 + Ss^2}$ (m)

$\sigma_{PVosc} \# C.T.\sqrt{Sb^2 + Ss^2}$ (m/s)

Figure 27A:
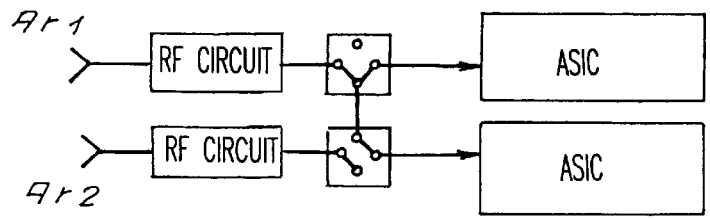
FIGS. 27A, 27B and 27C illustrate three configurations of a reference receiver for the system according to the invention.
Figure 27B:
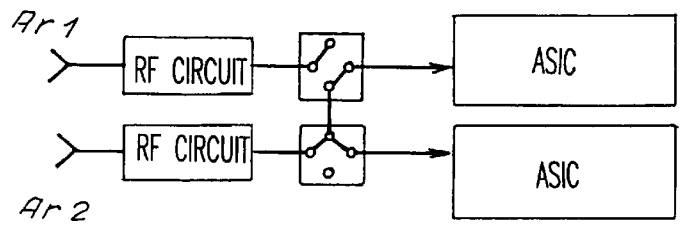

The global short term pseudo-range measurement noise (or pseudo-velocity) denoted $\sigma_{PD}$ (or $\sigma_{PV}$), is expressed as follows:

In an environment without any interference:

$\sigma_{PD} = \sqrt{\sigma PD^2_{enbij} + \sigma PD^2_{osc}}$ $\sigma_{PV} = \sqrt{\sigma PV^2_{enbij} + \sigma PV^2_{osc}}$ In an environment with interference:

$\sigma_{PD} = \sqrt{\sigma PD^2_{ebij} + \sigma PD^2_{osc}}$ $\sigma_{PV} = \sqrt{\sigma PV^2_{ebij} + \sigma PV^2_{osc}}$ Strategies for initializing the system according to the invention In the case of a reference receiver illustrated in FIGS. 27A or 27B, this receiver changes to single frequency mode during the initialization process. The switches should be conFigured as follows for this purpose.

ASICs are assumed to be multistandard (suitable for codes $C_{c1}$ and $C_{c2}$) and are conFigured in single code mode ($C_{c1}$ or $C_{c2}$). Each channel searches for an orbitography beacon code $C_{oi.k}$ observable from a $C_j$ circle.

For example, considering the case of an orbit at altitude $h_1$ or $h_2$, observable codes may be denoted $C_{oi.1}$, $C_{oi.2}$, ..., $C_{oi.8}$, $C_{oi.9}$, ..., $C_{oi.15}$ (see rule for assigning codes to orbitography beacons).

A ZZZ receiver carries out an energy search in parallel for all short PN codes associated with orbitography beacons. In the case of the example mentioned, this number of codes is equal to 15. If the ASICs have n channels they must theoretically respect the following rule:

$2 \times n \geq 15$ hence $n \geq 8$.

Furthermore, if $n \geq 15$, the switches are no longer strictly necessary to put ASICs in parallel during the energy search.

Let:

BDij: The Doppler band located around frequency $f_i$ associated with altitude $h_j$.

Vjmax: The maximum radial velocity between the satellite and the beacon for altitude $h_j$.

$\Delta$Fijna : The width of a Doppler case associated with frequency $f_i$ and altitude $h_j$ in unassisted acquisition mode.

Tj: The average visibility duration of a beacon in a $C_j$ circle.

$T_{rmaxija}$: The maximum duration of the unaided energy search associated with frequency $f_i$ and altitude $h_j$.

$N_{cDijna}$: The number of Doppler cases for an unaided energy search at frequency $f_i$ and altitude $h_j$.

$\tau_{ijna}$: The complete scanning duration for the $C_{ci}$ short PN code at altitude $h_j$.

Therefore, we obtain:

$$N_{CDijna} = \frac{B_{Dij}}{\Delta F_{ijna}}; B_{dij} = \frac{2 \times f_i \times V_{jmax}}{C}; T_{r}\text{maxij}_{na} = N_{CDijna} \times \tau_{ijna} \leq T_j$$

Figure 28:
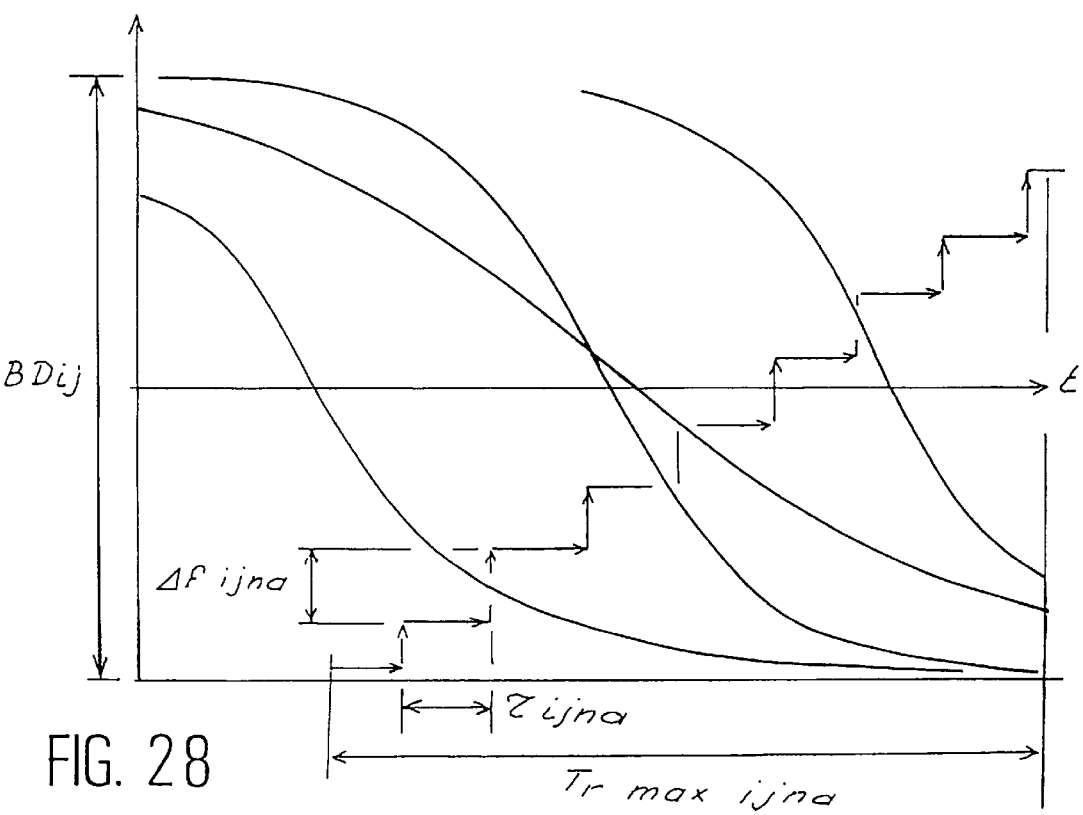
FIG. 28 illustrates an exploration of Doppler cases.

Doppler cases are explored in the direction opposite to the direction of the average variation of observed Dopplers, as shown in FIG. 28.

In a variant of the invention, only Doppler cases corresponding to positive Doppler variations are explored. This strategy may be adopted for stabilized three-axis satellites with inertial aiming.

By convention, a Doppler is positive when the satellite and the beacon considered are approaching each other.

Unprocessed measurements are carried out periodically. Doppler measurements are carried out in chained mode, provided that Doppler counting periods are strictly adjacent.

The ZZZ receiver navigator uses Doppler measurements and their relative dating to determine an initial orbit, in the same way as current DORIS navigators are self-initialized.

The absolute dating used is done using signals from master beacons which broadcast clock coefficients relative to the ZZZ time and to an international time such as UTC, and possibly from some beacons which are both orbitographic and time beacons, also broadcasting the said clock coefficients.

The improvement in the onboard orbitography precision is gradual until a stable value is reached. This precision is characterized by the standard deviation at 1 σ of the estimated range (radial) between the carrier satellite and a beacon denoted $\sigma_D$.

Figure 29:
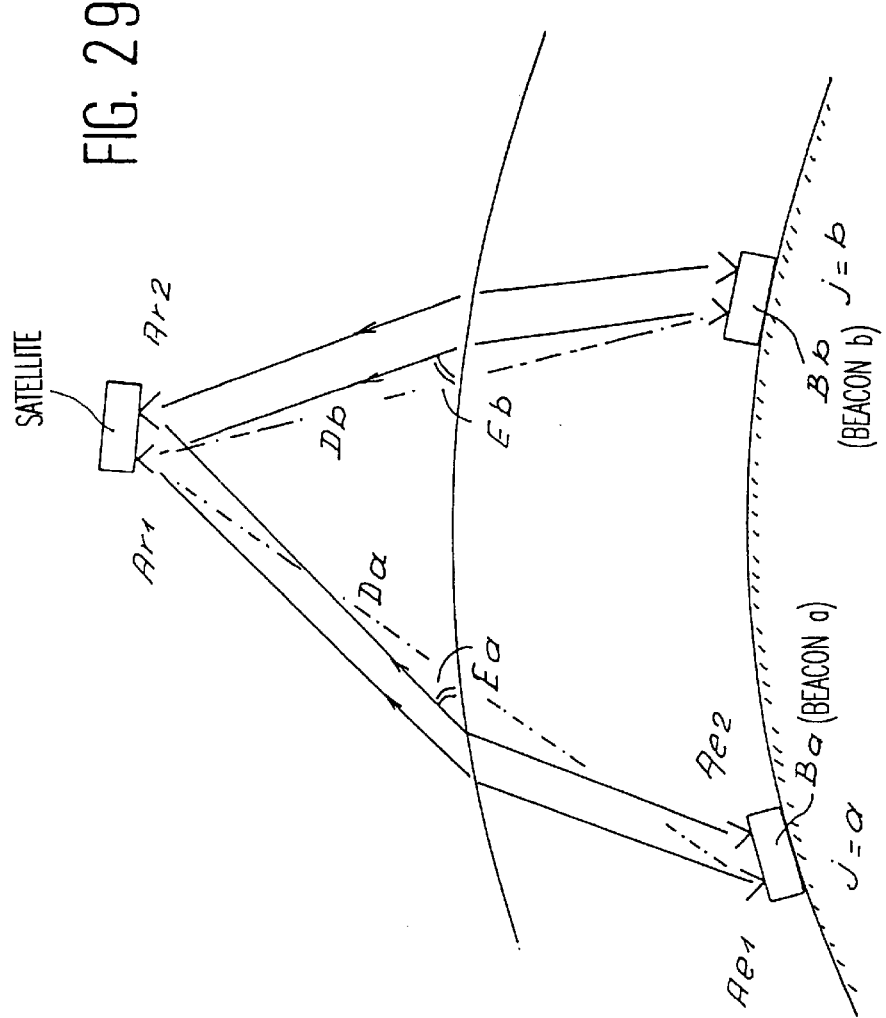
FIG. 29 illustrates a satellite equipped with a dual frequency ZZZ receiver.

The navigator can then determine the time difference between the receiver clock and the clock on a beacon using pseudo-range measurements associated with the said beacon. Beacons $B_j$ are considered, with a satellite equipped with dual frequency ZZZ receiver as shown in FIG. 29.

Pseudo-range measurements $PD_{ij}$ associated with beacon j=a and b and at frequency $f_i$ are such that:

$$PD_{ij} = D_j + C \cdot \Delta T_{jsat} + C \cdot (\tau_{ionoj-sat})i$$

where:

$\Delta T_{jsat}$ is the time difference between the satellite clock and the clock on beacon j;

$(\tau_{ionoj-sat})i$ is the ionospheric delay due to the satellite and beacon j, for frequency $f_i$.

$D_j$ is the range between beacon j and the satellite, usually well known once the navigator has properly converged.

The required time difference $\Delta T_{jsat}$ is therefore:

$$\Delta T_{jsat} = \frac{PD_{ij} - D_j}{C} - (\tau_{iono-sat})_i$$

The remaining unknown is the ionospheric delay $(\tau_{ionoj-sat})_i$. We obtain:

$$(\tau_{ionoj-sat})_i \# \frac{40.3 \cdot CET}{c \cdot \sin(Ej) \cdot f_i^2}$$

where $E_j$ is the elevation angle of the beacon j-satellite trajectory at the maximum electronic concentration of the ionosphere (in radians) which is generally known in advance;

CET is the total vertical electronic content of the ionosphere (in electron/m$^2$), generally known in advance.

The CET may be measured directly since the system used is dual frequency and enables pseudo-range measurements. We obtain:

$$CET = \frac{(PD_{1j} - PD_{2j}) \cdot \sin(Ej)}{40.3} \times \frac{f_1^2 \cdot f_2^2}{(f_2^2 - f_1^2)}$$

The ionospheric delay may therefore be measured:

$$(\tau_{ionoj-sat}) = \frac{(PD_{1j} - PD_{2j})}{c \cdot f_i^2} \times \frac{f_1^2 \cdot f_2^2}{(f_2^2 - f_1^2)}$$

The standard deviation $\sigma(\tau_{ionoj-sat})_i$ on the ionospheric delay measurement is therefore such that:

$$\sigma(\tau_{ionoj-sat})_i = \frac{f_1^2 \cdot f_2^2}{C(f_2^2 \cdot f_1^2) \cdot f_i^2} \cdot \sqrt{\sigma_{PD1j}^2 + \sigma_{PD2j}^2}$$

where $\sigma_{PDij}$ is the standard deviation of the pseudo-range measurement calculated for an environment with or without interference depending on the case.

The standard deviation $\sigma_{\Delta Tjsat}$ on the onboard-ground synchronization therefore becomes:

$$\sigma_{\Delta Tjsat} = \sqrt{\frac{\sigma_D^2 + \sigma_{PDij}^2}{C} + \sigma_{(\tau ionoj-sat)i}^2}$$

The uncertainty on the time difference $\tau_{jsat}$ calculated here ignores the calibration error in TPG of onboard-ground equipment denoted $E_{cal}$.

The global error made on the instantaneous estimate of $\Delta Tjsat$ is denoted $E_{\Delta Tjsat}$. This error may be increased by writing:

$$E_{\Delta Tjsat} \leq \sigma_{\Delta Tjsat} + E_{cal}$$

In practice, the ZZZ navigator may filter this error throughout the pass above the beacon concerned, in order to reduce it. This filter error is denoted $E_{\Delta Tjsat}$.

Nominal operating strategies for the system according to the invention.

When the number of ZZZ navigators of reference receivers initialized using measurements supplied in single frequency mode becomes the same as the number of limited channels, the said receivers changing to dual frequency mode.

Figure 27C:
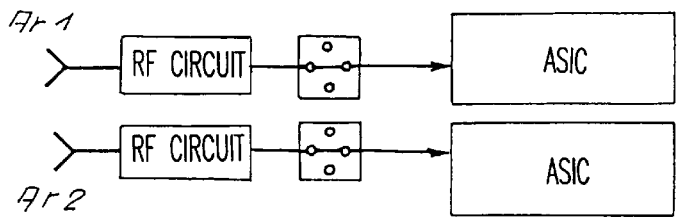

The associated configuration is shown in FIG. 27C.

Master satellites and some client satellites download unprocessed measurements and data received onboard to the control center again, and the control center prepares work plans for the said satellites. These work plans are composed mainly of client beacon numbers to be tracked and associated observation periods.

The control center may also send initialization plans to some satellites through master beacons, if necessary. For example, these plans may include orbital parameters for the said satellites and/or time differences between the beacons and the clock of these satellites. Once a beacon is nominally latched, it is tracked by orbiting satellites until it has set.

Initialized ZZZ navigators make Doppler prepositioning (or range pre-positioning) to reduce phase loop latching times (or code loop latching times) integrated in ASICs. This pre-positioning process is characterized by the following data:

$\Delta B_{Dijk}$ = Doppler prepositioning band associated with altitude $h_j$, frequency $f_i$ and onboard oscillator $k$.

$\Delta F_{ija}$ = Width of a Doppler case associated with frequency $f_i$ and altitude $h_j$ in a system acquisition mode.

$N_{CDija}$ = Number of Doppler cases for an aided energy search at frequency $f_i$, and altitude $h_j$ for the onboard oscillator $k$.

$N_{CDija} \# \frac{\Delta B_{Dijk}}{\Delta F_{ija}}$ $T_{r\,maxija}$ = Maximum duration of the assisted energy search.

$\tau_{ija}$ = Scanning period for the range prepositioning range of the $C_{ci}$ short PN code at altitude $h_j$.

$\Delta T_{ijk}$ = Width of the range prepositioning range.

-continued $$T_{rmaxija} = N_{CDija} \times \tau_{ija}$$

$= T_{rmaxija}$ is chosen such that $T_{rmaxija} \ll T_{rmaxijna}$ $\Delta T_{acq}$ = Maximum time difference between two assisted acquisitions of the same beacon.

$\left(\dfrac{\Delta F}{F}\right)_{\Delta Tacq}$ = Maximum frequency drift of a beacon during period $\Delta T_{acq}$.

Hence:

$$\Delta T_{ijk} \geq \Delta T_{acq} \times \left(\dfrac{\Delta F}{F}\right)_{\Delta Tacq} + E\Delta Tjsat$$

The width $\Delta T_{ijk}$ may be reduced if an estimate of the onboard clock shift is known on the onboard ZZZ receiver.

Onboard navigators can predict the Doppler along the center line of a beacon, and the associated pseudo-range.

Acquisition and tracking limits for pseudo-random codes may be reduced if the Doppler prediction is more precise than the prediction band $B_{Fi}$.

If a reduction is permitted by the "Code only" technique, the carrier loop for the ZZZ reception channel is open and the digitally controlled oscillator (OCN) is controlled by the Doppler prediction.

The reception channel code loop is of the second order and is maintained by Doppler assistance. It compensates for the error between the real Doppler and the predicted Doppler, and keeps the OCN oscillator in the servocontrolled loop. This is used to make pseudo-range measurements.

However, since the carrier loop is open, the ZZZ message is no longer demodulated. This method also tracks pseudo-random codes in an environment with stronger interference.

"Code Only" is particularly useful for receivers placed in a geostationary orbit (type $h_4$).

Pseudo-range measurements are overriding this case, unlike Doppler measurements which have low absolute values.

False acquisitions may occur when C/No ratios are low, which may be the case for the reception of ZZZ signals in a geostationary orbit.

Two techniques may be used to detect and reject these false acquisitions:

The RAIM ("Receiver Autonomous Integrity Monitoring"). This technique has been well tested in the field of GNSS receivers. It consists of carrying out a probability test on the quadratic sum of the remainders of pseudo-range measurements. A minimum number $N_{RAIM}$ of beacons must be acquired if this method is to be efficient.

Reinforcement of the robustness of the energy search; all code positions for which the latching limit in "Code only" mode is exceeded have to be noted and the code position associated with the maximum maximorum energy detected corresponding to the main correlation peak has to be selected, in order to reduce the risk of false acquisitions when scanning the energy search area".

When used in geostationary orbit, the receivers should initially be able to process:

two synchronized beacons (i.e. distributing clock coefficients) received above the conventional acquisition limit (i.e. without "Code only"); or at least $N_{Raim}$ unsynchronized beacons received above the conventional acquisition limit.

In this case, the receiver may determine a coarse orbit used to calculate a sufficiently precise Doppler prediction for use of "Code only". Beacons received above the conventional acquisition threshold by fixed geostationary satellites have a geographic latitude less than a limit, depending on the connection balance.

However, these initial conditions described above are not strictly necessary for most geostationary satellites in position. The maximum Doppler may actually be less than the prediction band $B_{Fi}$. This means that the initial Doppler prediction supplied by the navigator may simply be zero, while enabling acquisition in "Code only" mode to work provided that the onboard oscillator is sufficiently stable.

Figure 30:
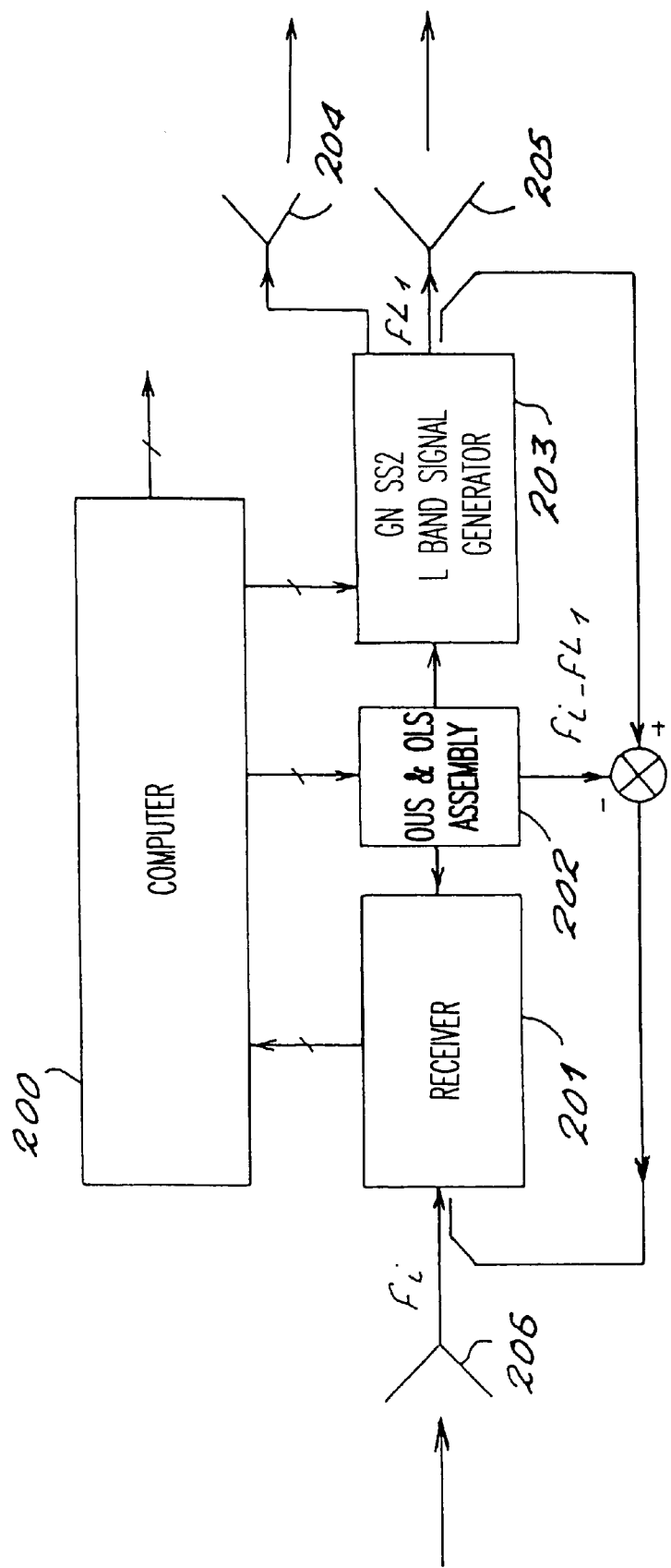
FIG. 30 illustrates an example of a GNSS2 navigation payload.

FIG. 30 shows an example of use of a GNSS2 navigation payload (in an $h_3$ or $h_4$ type orbit).

This Figure shows a computer 200 associated with formatters (with onboard orbitography and absolute synchronization) connected to a single frequency ZZZ receiver 201 connected to an antenna 206, an OUS+OLs assembly 202, a GNSS2 L band signal generator 203 connected to two antennas 204 and 205.

The choice of the type of ZZZ receiver (single frequency or dual frequency) is made as a function of the required precision for orbitography and the absolute onboard synchronization.

The navigation payload is equipped with a global calibration system necessary for operation of absolute synchronization. This global calibration system is advantageously simplified if modulation formats for ZZZ and GNSS2 signals are similar.

Use of the system according to the invention for clock synchronization

The system according to the invention can be used to determine the time difference $\Delta T_{ab}$ between clocks on two distinct beacons a and b, with high precision.

The time difference $\Delta T_{a\text{-}sat}$ between the beacon a and the satellite clock is determined as described above.

The time difference $\Delta T_{b\text{-}sat}$ between the beacon b and the satellite clock is determined in the same way.

Therefore, the instantaneous time difference $\Delta_{Tab}$ is obtained:

$$\Delta T_{ab} = \Delta T_{a\text{-}sat} - \Delta T_{b\text{-}sat}$$

Unprocessed pseudo-range measurements (associated with beacons a and b) used for this calculation must be made simultaneously.

Obviously, this time difference may be filtered onboard the ZZZ receiver in real time, or more precisely off-line in the control center (routine synchronization) or in the processing center (precise synchronization).

Example of synchronization of the ZZZ network using type $h_2$ orbiting satellites.

"Synchronization" means knowledge of the time difference between beacons.

Figure 31:
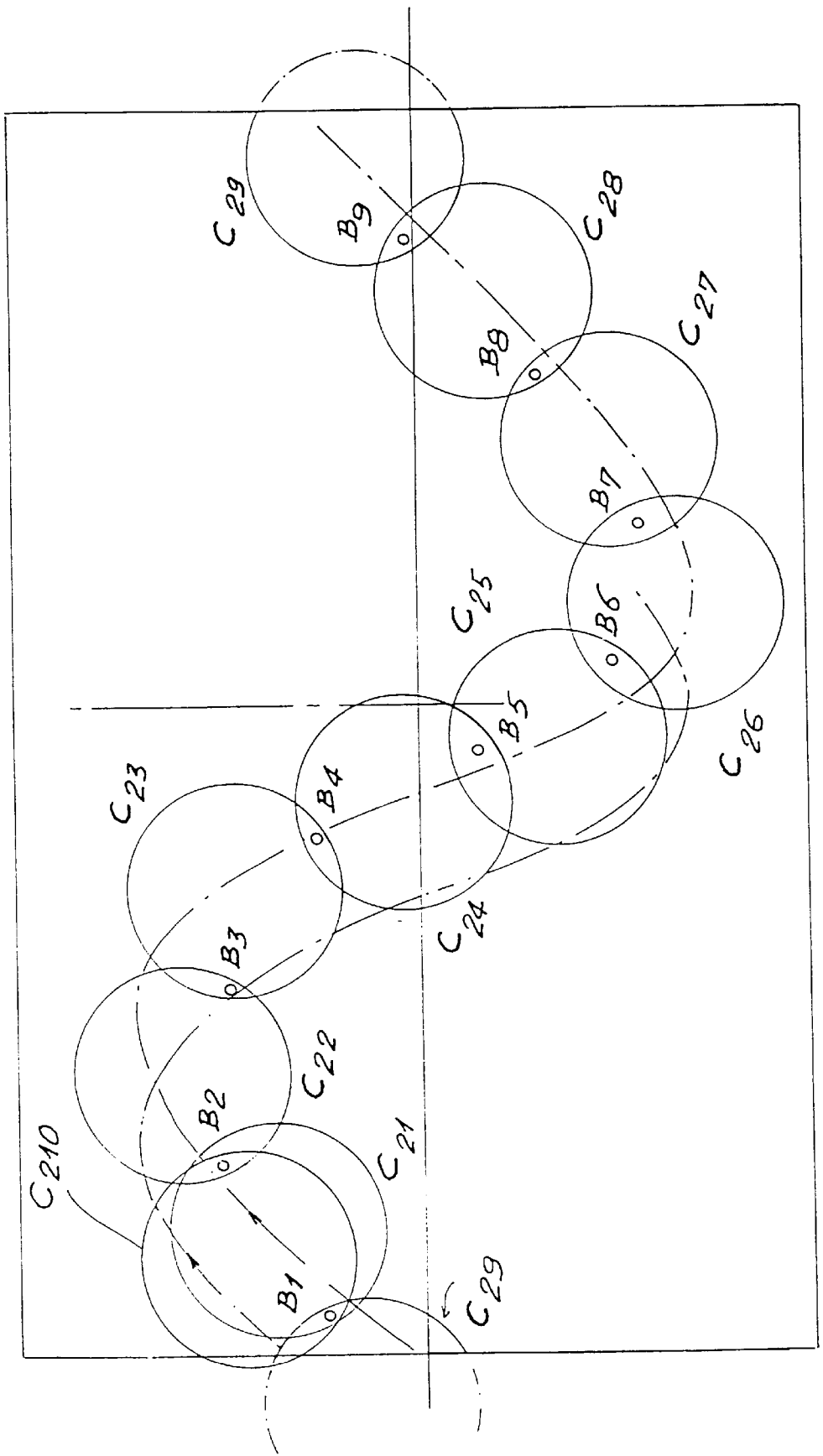
FIG. 31 represents a ground plot of a satellite with an $h_2$ type orbit.

FIG. 31 shows a ground plot of such a satellite and an example of overflown beacons (each $B_i$ being an example of beacons visible from the satellite considered, the $C_{2i}$ values being visibility circles associated with the plot of the satellite at altitude $h_2$).

The time difference $\Delta T_{B1B2}$ between beacon $B_1$ and $B_2$ is determined for the $C_{21}$ visibility circle.

Similarly, time differences determined for each visibility circle are shown sequentially.

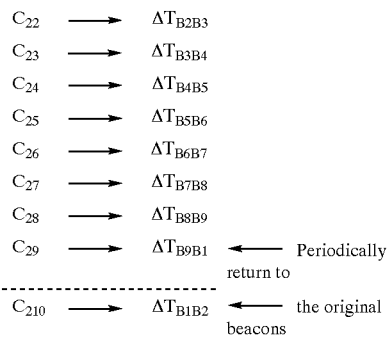

Therefore estimates of time differences between beacons can be periodically readjusted.

ZZZ network "synchronization" example using geostationary satellites, in addition to orbiting $h_2$ type satellites (development option)

For a geostationary satellites, the ground plot is limited to a small area which is almost a point: therefore by definition, the satellite is always above the same area on the earth.

Figure 32:
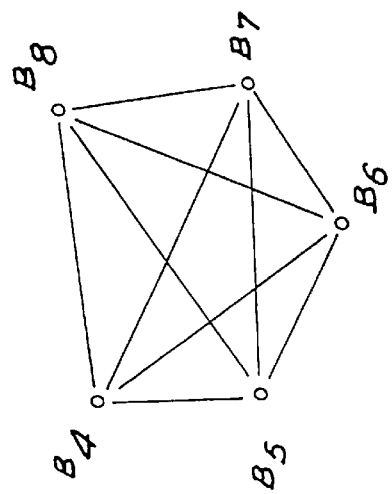
FIGS. 32 and 33 illustrate different time variations determined by a satellite.
Figure 33:
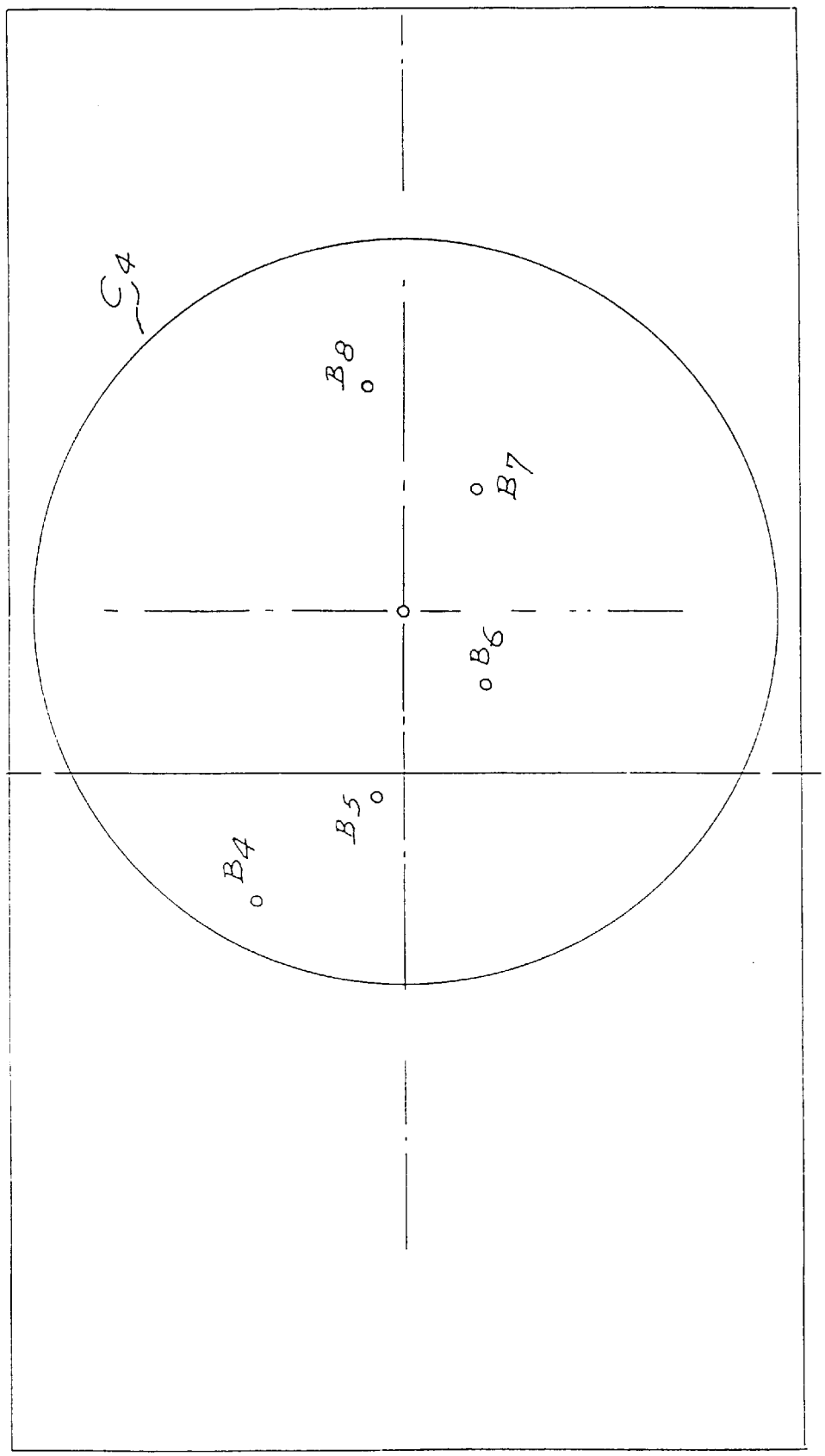

Therefore in the example considered, beacons $B_4$, $B_5$, $B_6$, $B_7$ and $B_8$ are permanently visible from the geostationary satellite, which can therefore determine the following time differences simultaneously and continuously:

$\Delta T_{B4B5}$
$\Delta T_{B5B6}$
$\Delta T_{B6B7}$
$\Delta T_{B7B8}$
$\Delta T_{B8B4}$
$\Delta T_{B4B6}$
$\Delta T_{B4B7}$
$\Delta T_{B5B7}$
$\Delta T_{B5B8}$
$\Delta T_{B6B8}$ as shown in FIGS. 32 and 33.

More generally, the number of time differences $N_{\Delta T}$ of this type associated with n beacons in a visibility circle is such that:

$$N_{\Delta T} = \frac{n(n-1)}{2}$$

Therefore, it is quite clear that there is an advantage in using master geostationary satellites carrying ZZZ receivers to synchronize the network of beacons more precisely than is possible using satellites in low orbit or in heliosynchronous orbit only, while enabling autonomous navigation of the said geostationary satellites.

More generally, pseudo-range measurements made by all master satellites and some client satellites may be used to synchronize the network, without all beacons being observed simultaneously.

The decisive advantage of the system according to the invention may be the use of the C/A GPS (and/or GNSS) technology for frequencies $f_1$ and $f_2$.

In this case, the cost of single frequency ZZZ receivers produced within a competitive industrial environment will be similar to the cost of GPS receivers, for equivalent navigation precision, or even better for ZZZ receivers (lack of "Selective Availability" and "Anti Spoofing" specific to the GPS system, better positioning of emitting references, located on the ground).

Furthermore, the costs of dual frequency reference ZZZ receivers may be more competitive than the cost of GPS or GLONASS dual frequency receivers since, unlike the latter, they do not need a technology adapted to tracking long codes. Furthermore, there are extra costs for civil dual frequency GPS receivers due to the use of "Codeless" measurement circuits.

In other words, the ZZZ system according to the invention is more competitive than GPS or GLONASS systems for most space applications. The same reasoning is even more true with respect to existing DORIS or PRARE systems. Furthermore, the system according to the invention potentially has a higher performance than all systems for most of their space applications.

REFERENCES

[1] "Le système DORIS" by Michel Dorrer ("Systèmes spatiaux de localisation et de navigation" (Space positioning and navigation systems), Toulouse, March 1989, CNES (French National Space Studies Center)

[2] "Calcul d'orbite à bord de SPOT 4 avec DORIS" (Onboard SPOT 4 orbit calculation with DORIS) by J. P Berthias, C. Jayles and D. Pradines (presented at the "Détection et Localisation spatiales" (Space Detection and Positioning) day organized by Club 23 in the Electricians and Electronics Engineers Society at the ONERA (French National Aeronautical Design and Research Organization) on Feb. 3, 1993)

[3] "Precise Centre National d'Etudes Spatiales orbits for TOPEX/POSEIDON: is reaching 2 cm still a challenge ?" by F. Nouël, J. P Berthias, M. Deleuze, A. Guitart, P. Laudet, A. Piuzzi, D. Pradines, C. Valorge, C. Dejoie, M. F. Susini and D. Taburiau (Journal of Geophysical Research vol. 99, No. C12, pages 24, 405–24, 419, December 1994)

[4] "Le système de localisation et de navigation GPS-NAVSTAR" (The GPS/NAVSTART positioning and navigation system) by Nicolas de Cheyzelles (Space Positioning and Navigation Systems, Toulouse, March 1989, CNES)

[5] "Technical Description and Characteristics of Global Space Navigation System GLONASS-M" (RTCA Paper No. 502-94/SC159-594)

[6] "The PRARE/GPS Experiment—A Contribution To Geodesy, Geodynamics and Navigation" by Wolfgand Lechner and Christoph Reigber (Satellite Navigation, conference of the Royal Institute of Navigation, 1989).

We claim:

1. A global system dedicated to radionavigation and radiopositioning, having a land segment, a space segment and a user segment, the land segment comprising:

a global network of beacons on the ground emitting an upwards single-directional radioelectric wide spectrum signal towards user satellites, each of the global network of beacons transmitting a message containing an identification code;

a control center configured to prepare work plans for some user satellites and transmit the work plans when the user satellites overfly master beacons, each of said work plans including at least one of a client beacon number and an observation period;

a processing center configured to receive remote measurements sorted by mission and control center, separate remote measurements into two groups, one containing remote measurements necessary for processing information specific to the processing center, and the other containing remote measurements specific to some clients of services offered by the system, wherein the space segment being composed of master satellites and client satellites, the master satellites participating closely in operation of the system, and the user segment is composed of client beacons and client receivers, and associated fixed or mobile carriers.

2. The system according to claim 1, wherein:

the beacons on the ground are of different types including, orbitography beacons, the position of which being known and that permanently transmit a signal and transmit a position thereof periodically;

client beacons including positioning beacons, whose exact position being unknown when put into service; and master beacons that transmit at least one of useful information and work plans to some user satellites and an accepting part of the system.

3. The system according to claim 1, wherein:

outputs produced by the processing center include:
precise orbitography and routine orders for some user satellites;
a precise attitude of some user satellites;
parameters representative of the ionosphere;
clock coefficients for some beacons referenced with respect to the system time;
the system time being produced by the processing center and being distributed partly to clients of services of the system and returned to the control center which uses the system time to prepare the work plan and to provide routine orbits to at least one of remote measurement stations and remote control stations using the services of the system.

4. The system according to claim 1, wherein:

the master satellites being equipped with a receiver capable of processing the message transmitted by the master beacons, and being connected to an ultra-stable oscillator, unprocessed measurements made by the master beacons being formatted in a form of remote receiver and the data originating from the measurements received by the ground, with the processing center as a final destination.

5. The system according to claim 4, wherein:

the master satellites have at least one of a quasiheliosynchronous orbit a low each orbit and a geostationary orbit.

6. The system according to claim 1, wherein:

client satellites do not send remote measurements therefrom to the processing center and are not capable of processing the message transmitted by master beacons.

7. The system according to claim 6, wherein:

client satellites being in any type of orbit and form part of the space segment and of the system user segment.

8. The system according to claim 1, wherein:

client beacons include positioning beacons, and time beacons.

9. The system according to claim 1, wherein:

a set of the beacons being connected to a microcomputer, used to program some beacon parameters and to verify that the beacons are working correctly.

10. The system according to claim 9, wherein:

the microcomputer being connected to local measurement sensors, including, meteorological data sensors,
GNSS unprocessed measurement sensors, or GNSS differential correction sensors;
clock coefficient sensors,
sensors determining a condition of the various elements making up the beacon in order to make remote diagnoses of failures, from the control center, and calibration sensors.

11. The system according to claim 1, in which beacons are single frequency or dual frequency.

12. The system according to claim 1, wherein:

said beacons include precision beacons.

13. The system according to claim 1, wherein:

two beacons being assigned with an identical PN code so as to be tracked by the same satellite and are separated by a range exceeding a diameter of a visibility circle associated with the satellite.

14. The system according to claim 1, wherein:

carriers transmitted by beacons are all modulated by a reference spectrum spreading code.

15. The system according to claim 1, comprising:

a client receiver that includes at least one of a single frequency receiver and a dual frequency receiver.

16. The system according to claim 1, wherein:

precision beacons of said network of beacons are dual frequency and that at least one of the transmitted carriers is modulated by a precision spectrum spreading code in addition to a reference code, a code length of said precision spectrum spreading code being greater than that of the reference code.

17. The system according to claim 1, which includes receivers in at least one of orbit close to the land surface and ground based.

18. The system according to claim 1, further comprising:

basic receivers;
navigation receivers having a predetermined cost;
navigation and attitude detection receivers having a predetermined cost;
navigation and attitude receivers;
navigation, orbitography and precision attitude detection receivers; and
mixed receivers capable of processing signals transmitted by beacons in the system, and by satellites in GNSS constellations.

19. The system according to claim 1, comprising:

receivers configured to process reference codes only; and
receivers configured to simultaneously process reference codes and precision codes.

20. The system according to claim 1, further comprising:

a subsystem for precise monitoring of a drift of an orbiting cold atomic clock.

21. The system according to claim 1, wherein:

sequencing of transmissions from client beacons is managed according to a daily cycle described by week words, wherein each week word including a transmit indicator for each day of the week.

22. The system according to claim 1, wherein:

beacons on the ground have a common electrical and antenna architecture, except for,
beacons adapted for precise monitoring of a drift of an orbiting cold atomic clock, which have a directional diagram instead of a hemispherical type antenna diagram, and
beacons in local autonomous cells which have a specific antenna diagram.

23. The system according to claim 1, being configured for use with an interferrometric imagery technique using S.A.R. radar satellites for monitoring precise deformations of a terrain covered by a mesh of beacons received by a receiver forming part of the system installed on radar satellites.

24. The system according to claim 1, configured to determine precise variations between beacon clocks, and time beacons in particular, using orbiting and geostationary satellites carrying a receiver of the system.

25. The system according to claim 1, including GNSS2 navigation satellites configured to use a receiver of the system for navigation, and for deriving orbit and time ephemeris tables to be broadcast to users of the GNSS2 satellites.

26. The system according to claim 1, including a local autonomous beacon and receiver cells, and said receiver cells being radioelectrically connected to master or client satellites.

27. Beacon used in the system according to claim 1, which comprises:
   at least one local data sensor;
   a control computer connected to the said data sensor;
   a reference signal generator controlled by the said oscillator;
   a signal generation and transmission module for each transmitted carrier frequency controlled by the reference signal generator, this module comprising:
      a carrier generator;
      a short spectral spreading code generator;
      a data formatter controlled by the control computer, the said data modulating the said short code in the base band through an integrator, the assembly modulating the carrier with a modulator;
      an antenna, connected to the modulator through an RF amplifier.

28. The system having the beacon according to claim 27, wherein the transmitted carrier frequency being included as a frequency used in the system.

29. The system having the beacon according to claim 27, wherein said beacon being configured to transmit one of a dual frequency and a single frequency signal.

30. The system having the beacon according to claim 27, wherein:
   the beacon includes a precision beacon and includes at least one of the signal generation and transmission modules, which further comprises,
   a spectrum spreading code generator that generates a long code having a predetermined code length lower than that produced by said short spectral spreading code generator;
   an integrator configured to modulate said long code by a message output from the data formatter;
   a carrier modulated by the long code integrated with data;
   a phase shifter configured to input a $\pi/4$ phase shift of the modulated carrier; and
   an adder configured to integrate the carrier modulated by the long code in quadrature with the carrier modulated by the short code.

31. The system having the beacon according to claim 27, wherein:
   said beacon being a precision beacon configured to transmit long codes having a code length longer than that produced by said short spectral spreading code generator at a frequency specific to the system.

32. The system having a receiver used in the system according to claim 1, comprising for each received carrier frequency:
   one to four reception antennas;
   one to four radiofrequency reception and intermediate frequency transposition modules, connected to an analogue digital converter, and being specific to the received carrier frequency of the system;
   at least one ASIC circuit configured to process a short spectrum spreading code that modulates the received carrier, said short spectrum spreading code having a predetermined code length;
   a microprocessor assembly interconnected firstly to the at least one ASIC circuit and secondly to a memory assembly and to a digital interface;
   an oscillator configured to control radiofrequency reception and intermediate frequency transposition modules, the at least one ASIC circuit and the microprocessor assembly.

33. The system having the receiver according to claim 32, comprising a radiofrequency reception and transposition module configured to process a signal from each antenna in a parallel RF architecture.

34. The system having the receiver according to claim 32, wherein:
   a single radiofrequency reception and intermediate frequency transposition module is interconnected to all of the one to four antennas through a fast switch for receivers with sequenced RF architecture.

35. The system having the receiver according to claim 32, wherein:
   a mixed receiver being one of the radiofrequency reception and intermediate frequency transposition modules and being adapted to operate at one of two operating frequencies of the system; and
   another RF reception and IF transposition module being adapted to operate in a frequency band distributed by satellites in GNSS constellations.

36. The system having the receiver according to claim 32, wherein:
   said receiver being a precision receiver adapted to receive a long code used in said system, at the received carrier of the system, said long code having a longer code length than the predetermined code length of said short spectrum spreading code, the ASIC circuit being capable of simultaneously processing the short spectrum spreading code and the long code.

* * * * *